(12) United States Patent
Marciano et al.

(10) Patent No.: US 11,261,010 B2
(45) Date of Patent: Mar. 1, 2022

(54) LIQUID DISPENSER WITH RETRACTABLE SPOUT

(71) Applicant: Robert Marciano, Glen Osmond (AU)

(72) Inventors: Robert Marciano, Glen Osmond (AU); Beau Kuchel, Glen Osmond (AU)

(73) Assignee: Robert Marciano

( * ) Notice: Subject to any disclaimer, the term of this patent is extended or adjusted under 35 U.S.C. 154(b) by 0 days.

(21) Appl. No.: 16/973,670

(22) PCT Filed: May 28, 2019

(86) PCT No.: PCT/AU2019/050528
§ 371 (c)(1),
(2) Date: Dec. 9, 2020

(87) PCT Pub. No.: WO2020/010384
PCT Pub. Date: Jan. 16, 2020

(65) Prior Publication Data
US 2021/0253311 A1    Aug. 19, 2021

(30) Foreign Application Priority Data

Jul. 11, 2018 (AU) .................................. 2018902518

(51) Int. Cl.
| | | |
|---|---|---|
| B65D 47/06 | (2006.01) |
| B01F 3/04 | (2006.01) |
| B65D 47/20 | (2006.01) |
| B65D 47/32 | (2006.01) |
| B67D 3/00 | (2006.01) |
| G01F 11/26 | (2006.01) |
| B01F 5/00 | (2006.01) |

(52) U.S. Cl.
CPC .......... *B65D 47/061* (2013.01); *B01F 3/0446* (2013.01); *B01F 3/04787* (2013.01); *B65D 47/2006* (2013.01); *B65D 47/32* (2013.01); *B67D 3/0051* (2013.01); *G01F 11/265* (2013.01); *B01F 2003/04872* (2013.01); *B01F 2005/0025* (2013.01); *B01F 2215/0072* (2013.01)

(58) Field of Classification Search
CPC .. B65D 47/061; B65D 47/2006; B65D 47/32; B01F 3/0446; B01F 3/04787; B67D 3/0051; G01F 11/265
USPC .............. 222/72, 21, 20, 443, 448, 449, 454
See application file for complete search history.

(56) References Cited

U.S. PATENT DOCUMENTS

| | | | | |
|---|---|---|---|---|
| 1,305,476 A | * | 6/1919 | McCord .................. | G01F 11/32 222/449 |
| 2,106,649 A | * | 1/1938 | Officer, Jr. .............. | G01F 11/32 222/157 |
| 2,222,594 A | * | 11/1940 | Metcalf .................. | B65D 23/00 210/514 |

(Continued)

*Primary Examiner* — Paul R Durand
*Assistant Examiner* — Michael J. Melaragno
(74) *Attorney, Agent, or Firm* — Sand, Sebolt & Wernow Co., LPA

(57) ABSTRACT

There is proposed a dispensing apparatus attachable to a container that includes a retractable spout. The dispensing apparatus can dispense a predetermined volume of liquid or aerate a liquid being dispensed, wherein the retractable spout includes a volumetric dispensing assembly for dispense the predetermined volume of liquid, and/or a turbulence forming element that is configured to aerate the liquid.

23 Claims, 20 Drawing Sheets

(56) References Cited

U.S. PATENT DOCUMENTS

| | | | | | |
|---|---|---|---|---|---|
| 2,368,540 | A * | 1/1945 | Goodman | G01F 11/265 | 222/477 |
| 2,506,125 | A * | 5/1950 | White | B67D 3/00 | 222/442 |
| 2,968,423 | A * | 1/1961 | Mahler | G01F 11/265 | 222/49 |
| 3,129,859 | A * | 4/1964 | Chappell | G01F 11/265 | 222/456 |
| 3,233,797 | A * | 2/1966 | Conry | G01F 11/265 | 222/477 |
| 3,321,113 | A * | 5/1967 | Conry | G01F 11/265 | 222/477 |
| 4,210,263 | A * | 7/1980 | Bos | G01F 11/32 | 222/449 |
| 4,243,157 | A * | 1/1981 | Rettberg | G01F 11/268 | 222/44 |
| 4,407,435 | A * | 10/1983 | Harmon | G01F 11/00 | 137/512.2 |
| 4,984,719 | A * | 1/1991 | Brunton | B67D 3/00 | 137/513.5 |
| 5,044,521 | A * | 9/1991 | Peckels | B67D 3/0077 | 222/23 |
| 5,078,305 | A * | 1/1992 | Glynn | G01F 11/263 | 222/442 |
| 5,961,008 | A * | 10/1999 | Peckels | B65D 39/06 | 222/477 |
| 6,026,994 | A * | 2/2000 | Rigel | B65D 47/061 | 222/478 |
| 6,409,046 | B1 * | 6/2002 | Peckels | B67D 3/0041 | 222/1 |
| 6,568,660 | B1 * | 5/2003 | Flanbaum | B65D 47/06 | 222/189.07 |
| 8,245,882 | B1 * | 8/2012 | Federighi | B01F 5/0428 | 222/190 |
| 9,061,302 | B1 * | 6/2015 | Peckels | B05B 1/302 | |
| 9,254,944 | B1 * | 2/2016 | Peckels | G01F 11/265 | |
| 9,624,085 | B1 * | 4/2017 | Peckels | B67D 3/0041 | |
| 10,329,054 | B1 * | 6/2019 | Haldiman | B65D 47/243 | |
| 2002/0074366 | A1 * | 6/2002 | Young | B65D 47/32 | 222/484 |
| 2011/0036873 | A1 * | 2/2011 | Peckels | B67D 3/0045 | 222/476 |
| 2012/0074172 | A1 * | 3/2012 | Federighi | B01F 5/0428 | 222/190 |
| 2013/0056502 | A1 * | 3/2013 | Zapp | G01F 11/263 | 222/500 |
| 2013/0122161 | A1 * | 5/2013 | Cole | C12G 1/04 | 426/271 |
| 2014/0069961 | A1 * | 3/2014 | Harms | G01F 11/265 | 222/321.6 |
| 2015/0251822 | A1 * | 9/2015 | Slevin | B65D 47/06 | 222/570 |
| 2019/0009226 | A1 * | 1/2019 | Poul | B01F 3/04744 | |
| 2019/0270551 | A1 * | 9/2019 | Limbrey | B65D 47/06 | |

* cited by examiner

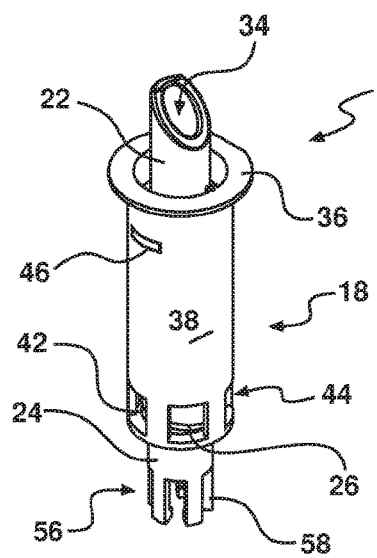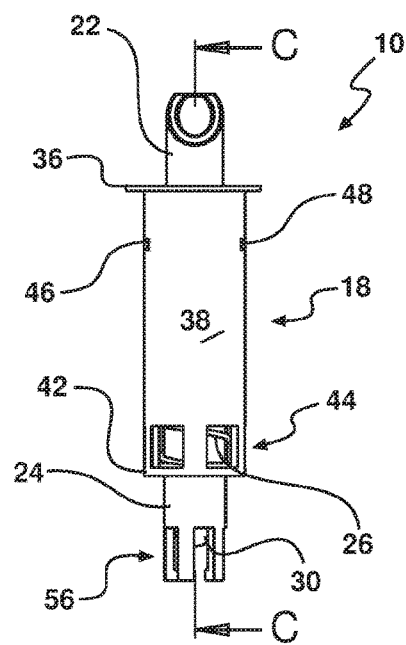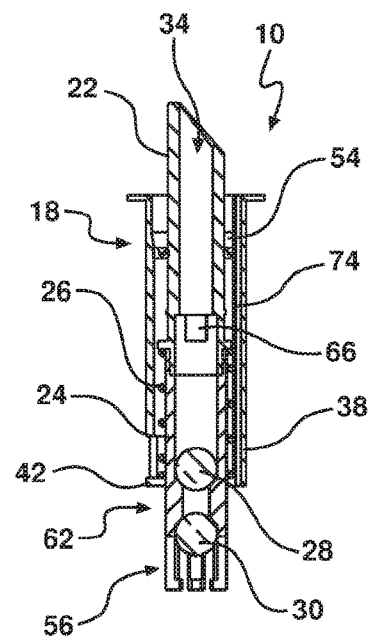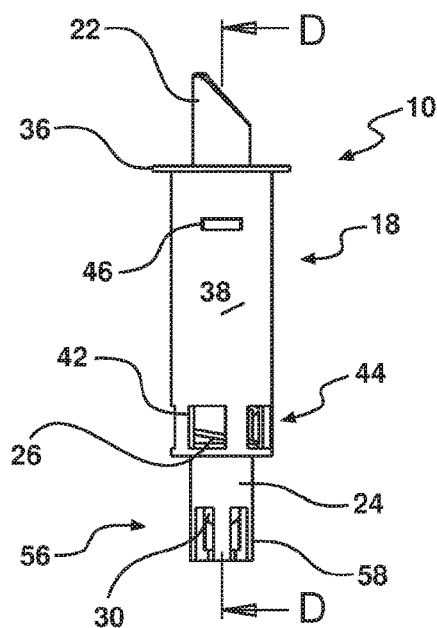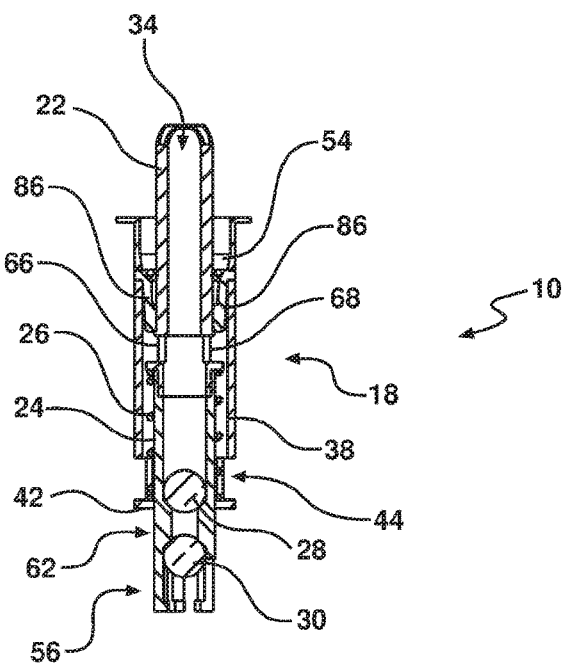
Figure 5a
Figure 5b
Figure 5c
Figure 5d
Figure 5e

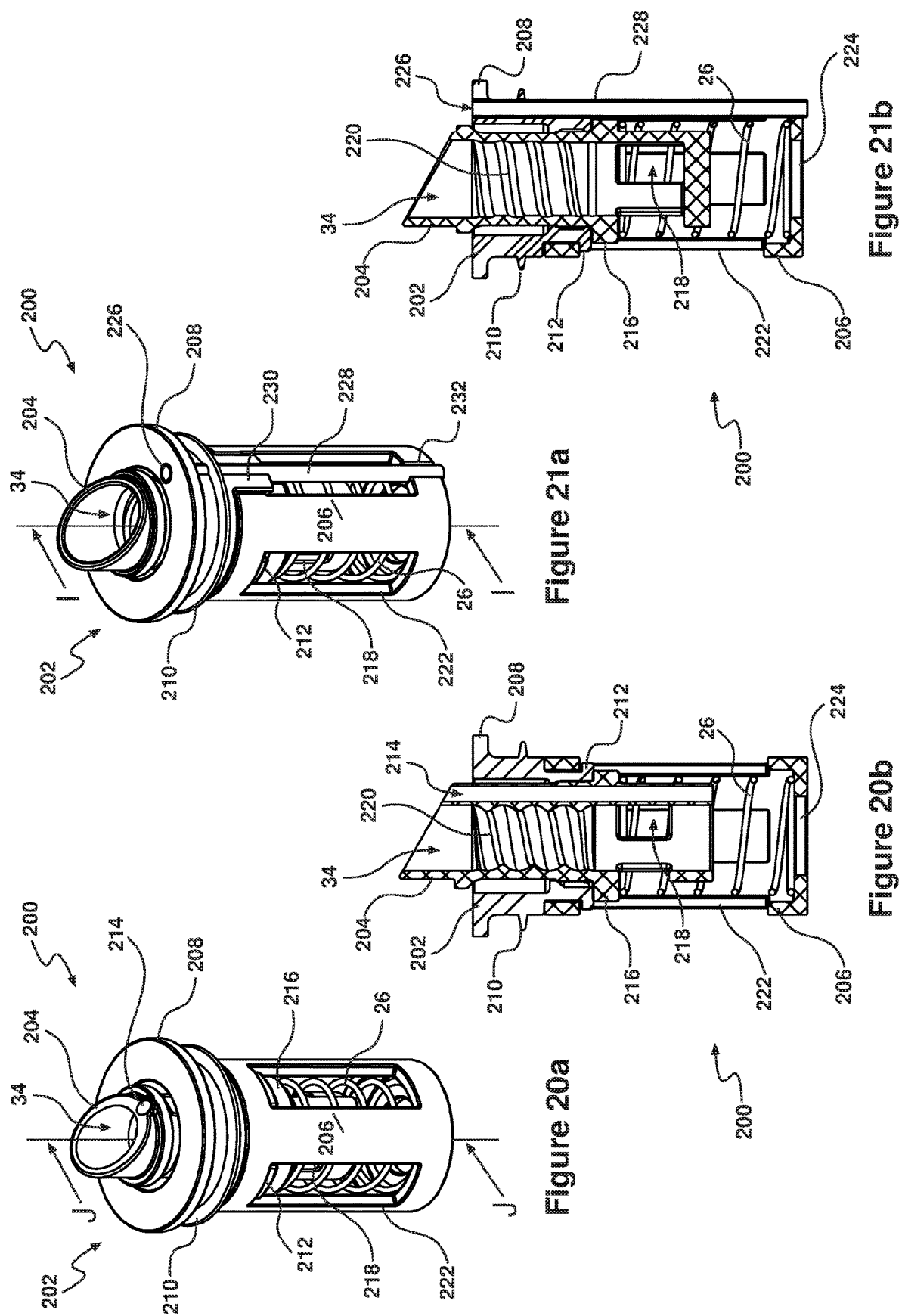

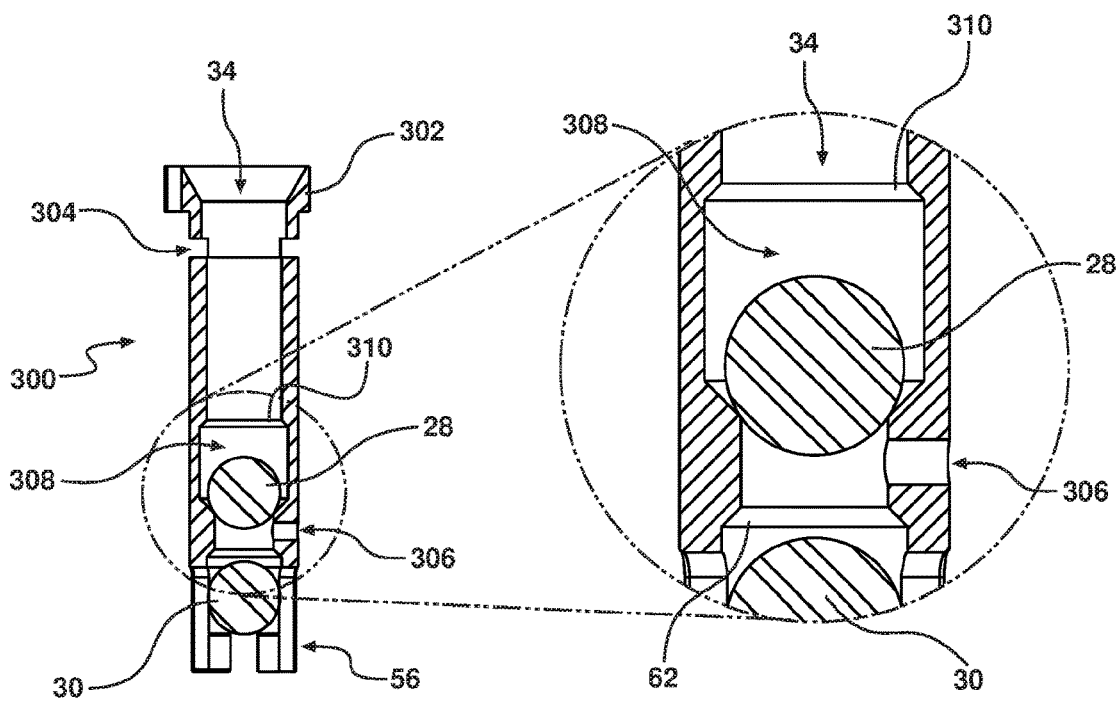
Figure 25
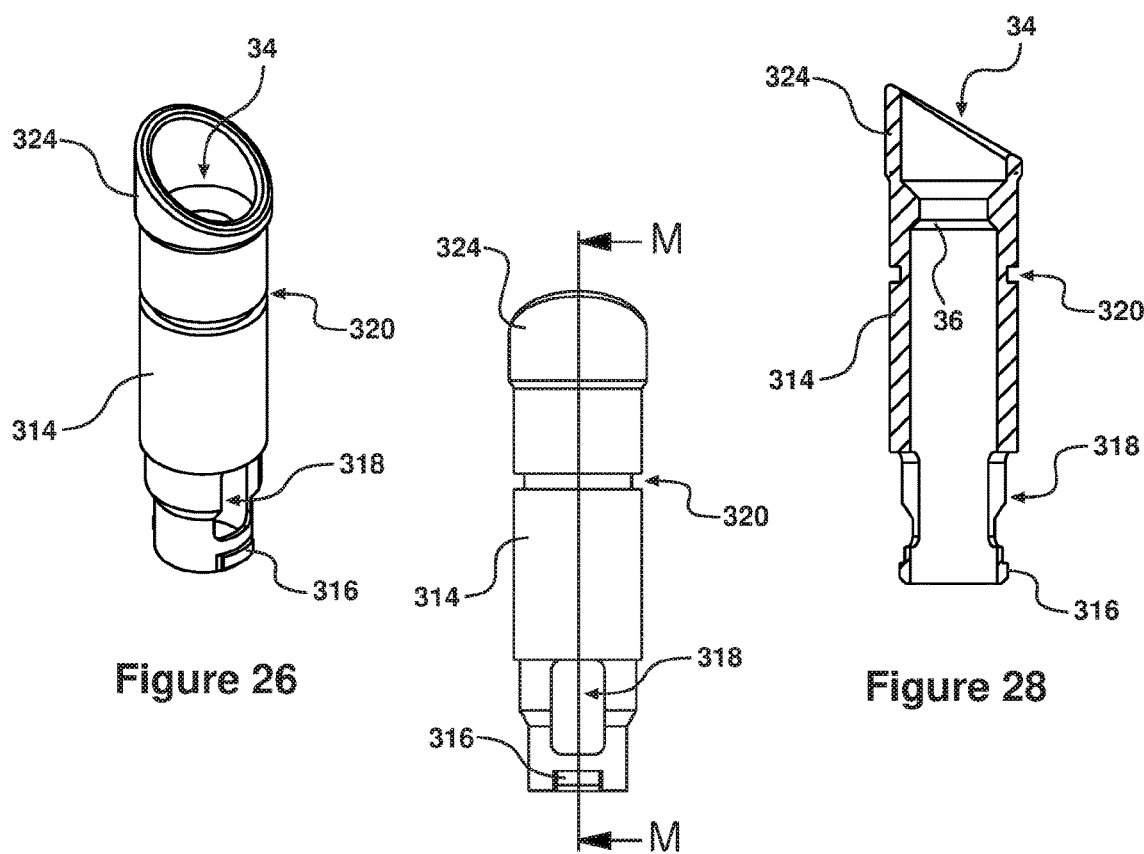
Figure 26
Figure 27
Figure 28

LIQUID DISPENSER WITH RETRACTABLE SPOUT

FIELD OF THE INVENTION

The present invention relates to a top for a container that includes a retractable spout and is capable of dispensing a predetermined volume of liquid or aerating a flow of liquid passing therethrough.

BACKGROUND OF THE INVENTION

There are various spouts used in dispensing fluids and liquids from containers currently used and suggested in the published prior art. Some spouts include a volumetric control for dispensing a predetermined volume of fluid. One such spout is used on alcoholic beverage bottles to dispense a predetermined amount of fluid, such as when pouring a shot of alcohol or mixing a cocktail.

One of the most popular conventional shot pourers was first disclosed in U.S. Pat. No. 3,233,797 (Conry) entitled Measuring Pourer having a Gravity Operated Valve, that dates back to 1964. Conry teaches a measuring pourer for dispensing liquid from the mouth of a bottle, including a pouring tube having a ball seat at its upper end and an opening in the wall thereof for passage of liquid in quantity thereinto. A ball having a diameter only slightly smaller than the inner diameter of the pouring tube passageway, is movably held within the pouring tube, whereupon as said pourer is tilted from the vertical past the horizontal, the ball moves along the pouring tube passageway to the ball seat, to thereby shut off the flow of liquid therethrough. The skilled addressee will appreciate that although a secondary ball valve is typically used in conventional shot pourers the principle of measuring the shot, as disclosed in Conry, has not substantially changed.

Another device for dispensing a set volume of liquid is disclosed in U.S. Pat. No. 3,434,636 (Kachman) entitled Pourer for Liquor Bottles. Kachman teaches a pourer having a hollow body, including a laterally directed spout and a tubular shank, wherein a series of flexible deformable ribs are adapted to sealingly engage the interior of the bottle outlet.

One of the limitations with such pouring devices is that the spout is typically exposed to the surrounding environment. It has been found that insects, including fruit flies, are attracted to the sweet liquid and can crawl into or become lodged within the spout.

There are also a number of retractable spouts disclosed in the prior art, including the retractable spout disclosed in U.S. Pat. No. 6,976,610 (Rigel 1). The retractable spout is movable within a housing from a retracted position, wherein the bottle neck is closed by a cap, into an extended position wherein the spout projecting outwardly of the bottle neck for pouring out the contents of the bottle. Another patent in the name of the same inventor, WO 2011/135575 (Rigel 2), discloses a bottle accessory for attaching a retractable spout to a bottle neck using a cap. The bottle accessory includes a housing dimensioned so as to be fixedly received within the bottle neck and a connector attached to the upper end of the housing and receivable within the cap to serve as an inner liner. However, neither Rigel 1 or Rigel 2, discloses volumetric control of a liquid being dispensed.

Another issue that occurs with some fluid, such as red wine, is that it is beneficial to aerate the fluid. Aerate of red wine prior to consumption can reduce the ethanol content which will improve the wine flavour. After a short period of time aerated wine will begin to oxidize, which results in the flavours and aromas flattening out. Accordingly, it is important that the aeration of the red wine occurs shortly before consumption. Decanting devices and funnels can be used to aerate wine, however these are not always available and at time can be expensive.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application. The reader should appreciate that the phase "neck of" the container or bottle should be given its broadest definition and include the opening of any container. Furthermore, the term "liquid" may include any flowable substance, such as but not limited to, a beverage, food grade fluid, industrial chemical or other fluid.

SUMMARY OF THE INVENTION

It is an object of the present invention to provide for a dispensing apparatus for connection to a container that includes a retractable spout, and which can dispense a predetermined volume of liquid or aerate a liquid being dispensed. It is another object of the invention to provide a spout that can both dispense a predetermined volume of liquid and to also permit continuous flow through of a liquid. It is still a further object of the present invention to overcome at least some of the aforementioned problems, or at least provide the public with a useful alternative. The foregoing objects should not necessarily be considered as cumulative and various aspects of the invention may fulfil one or more of the above objects.

Therefore, the invention could generally be understood to comprise a dispensing apparatus attachable to a container that includes a retractable spout, and which can dispense a predetermined volume of liquid or aerate a liquid being dispensed.

The retractable spout may include a volumetric dispensing assembly for dispense the predetermined volume of liquid. Alternatively, the retractable spout may include a turbulence forming element that is configured to aerate the liquid.

In one aspect of the invention, but not necessarily the broadest or only aspect, there is proposed a liquid dispenser, attachable to a neck of a container, comprising:
a body configured to sealable engage the neck of the container, the body including a generally annular top and a generally cylindrical sleeve depending therefrom;
a pouring tube dimensioned to slidably engage the generally cylindrical sleeve, the pouring tube including a passageway extending therethrough;
a biasing member positionable within or adjacent the body and configured to bias the pouring tube into a first extended position relative the body, whereby an outer end of the pouring tube extends outwardly of the neck of the container; and
    a volumetric dispensing assembly for dispensing a predetermined volume of liquid; and/or
    a turbulence forming element for aerate the liquid being dispensed.

The liquid dispenser may include a retaining clip configured to fixedly connect to the body to maintain the pouring tube in slidable engagement with the body.

The biasing member is preferably a helical spring, and in one from is constructed from steel. The pouring tube is moved against the bias of the biasing member as the lid or cap is attached to the container, wherein the lid bears against a top of the pouring tube to move it into a retracted position. When the lid or cap is removed the pouring tube moves under the influence of the biasing member into the extended position. An insert may be retained within the lid or cap, which is shaped to bear against an upper part of the pouring tube.

Preferably, the body includes a vent aperture extending therethrough. The body preferably include a spring seat or fixing means for supporting the helical spring thereon.

The sleeve may include a plurality of openings in a lower end for passage of the liquid therethrough. The sleeve may further include opposing slots in an upper part thereof for engagement with respective projections on opposite sides of the retaining clip.

A circumferential part of the annular top may be configured to abut a top of the container, such as a bottle, and may include an annular seal to inhibit leakage of the liquid therearound. The annular top may include a narrower neck portion that is configured to reversibly engage a seal, such as an O-ring, that is attached to the pouring tube.

The pouring tube may comprise upper and lower portions that are fixedly engageable. In one form the upper portion includes an annular protrusion that is configured to engage with an annular groove in the lower portion to thereby fasten the portions together. Alternatively, the upper and lower portions may be glued or heat welded together.

The volumetric dispensing assembly may comprise at least one ball positionable within a passageway extending through the pouring tube, and having an opening in a side thereof adjacent a primary ball seat. The at least one ball moveable to control the flow of liquid through the passageway. The volumetric dispensing assembly may include a primary ball and a secondary ball.

The primary ball may have a diameter only slightly smaller than the inner diameter of the passageway of the pouring tube, to thereby allow the primary ball to freely move within the pouring tube and abut against the primary ball seat. The secondary ball is configured to affect the movement of the primary ball along the passageway toward the primary seat to, in one aspect of the invention, shut off the flow of liquid therethrough.

The passageway may include an enlarged compartment and narrow part, wherein the narrow part is configured to slow or delay the movement of the primary ball, as the bottle is tilted, to ensure that an upper portion of the passageway fills with fluid. This configuration means that the correct amount of fluid is retained within the pouring tube to be dispensed as the primary ball comes into contact with the primary ball seat.

The purpose of the secondary ball is to inhibit rear pressure being applied to the primary ball which would otherwise force it along the passageway. The secondary ball disengages from the secondary ball seat when the bottle is tilted back towards the vertical position to thereby permit the primary ball to drop back to a mid-region of the lower portion of the pouring tube.

The lower portion may be generally cylindrical, with a narrower portion at the mid region thereof. In one form the lower portion includes a cage at a lower end for receiving the secondary ball therein and a secondary ball seat. The secondary ball is movably held within the cage whereby when the bottle is tilted past a horizontal orientation the secondary ball abuts the secondary ball seat to inhibit movement of the liquid through the mid region of the lower portion.

A section of the lower portion above the mid region is configured to retain a primary ball, wherein the primary ball is able to freely move therealong.

The upper portion of the pouring tube preferably includes the primary ball seat adjacent a lower end thereof, adjacent and above opposing openings in the passageway. The section of the upper portion above the primary ball seat is generally cylindrical and may include a slanting top edge to inhibit dripping when pouring. The upper portion of the pouring tube may further include an annular lip above and adjacent the opposing openings. Preferably the upper portion includes an outwardly extending shoulder adjacent the lower end and configured to engage with a top of the helical spring.

When assembled the helical spring may be preferably held between the spring seat of the body and the outwardly extending shoulder of the upper portion of the pouring tube.

When the upper and lower portions of the pouring tube are assembled, the primary ball is moveably held within the passageway, and in one aspect of the invention is able to abut the primary ball seat, when the bottle is tilted past the horizontal, to thereby dispense a desired volume of liquid. The reader should appreciate that the volume of liquid dispensed is preferably set during the production stage, taking into consideration user preferences or other factors. For instance, the volume of liquid dispensed by be 10 mL, 20 mL or 30 mL.

The pouring tube may be held in slidable engagement with the body by way of the retaining clip, which may comprise a generally annular part, projections on opposite sides for engagement with respective slots in the sleeve, and legs depending from opposite sides of the annular part.

The legs preferably include respective inwardly facing extension that are configured to engage through the opposing openings in the passageway of the upper portion, to thereby inhibit the primary ball from abutting the primary ball seat, but still allowing movement of fluid through the opposing openings into the passageway.

Preferably, the pouring tube is movable under the influence of the helical spring into a first extended position wherein the inwardly facing extension of the legs engage the annular lip of the upper portion of the pouring tube, whereby when the bottle is tilted past the horizontal the primary ball abuts the primary ball seat to thereby inhibit movement of the liquid out of the bottle through the dispenser.

The pouring tube may be manually moved further outwardly by a user, such as being grasped and pull further outwardly, into a second extended position, such that the inwardly facing extensions are caused to move past the annular lip, whereby the extensions engage through respective openings in the passageway of the upper portion, wherein when the bottle is tilted past the horizontal the primary ball is held in a position spaced apart from the primary ball seat, to thereby allow movement of the liquid out of the bottle through the dispenser.

The sleeve preferably includes a longitudinally extending ridge down an inner surface thereof. The shoulder of the upper portion of the pouring tube and the generally annular part of the retaining clip, both include respective notches configured to slidably engage the ridge, such that the pouring tube aligns with the retaining clip to ensure that the inwardly facing extensions can engage through respective openings in the passageway of the upper portion, when the pouring tube is in the second extended position.

The dispensing apparatus may include an additional seal or seals to inhibit leakage around the spout or the edge of the dispensing apparatus when the fluid is being poured, as would be obvious to a person skilled in the art. Various rolling or static seals could be used without departing from the scope of the invention. Furthermore, the additional seal or seals may permit the use of the liquid dispenser in a range of bottles with different sized necks or different styles.

In another aspect of the invention there is proposed a container including a liquid dispenser as hereinbefore described. In one form the container is a bottle for holding an alcoholic beverage.

In still another aspect of the invention there is proposed a method of dispensing a liquid from a container, including the steps of:
i) providing a liquid dispenser, comprising, a body having an annular top and a cylindrical sleeve depending therefrom, a pouring tube dimensioned to slidably engage the sleeve, the pouring tube including a passageway extending therethrough and openings in sides thereof, adjacent a primary ball seat, at least one ball positionable within the passageway and moveable to control the flow of liquid through the passageway, a biasing member positionable within the body and configured to bias the pouring tube into a first extended position relative the body, and a retaining clip configured to fixedly connect to the body to maintain the pouring tube in slidable engagement with the body;
ii) attaching the liquid dispenser into a neck of the container;
iii) permitting the pouring tube to more into the first extended position under the influence of the biasing member;
iv) tilting the longitudinal axis of the container past a horizontal wherein the primary ball abuts the primary ball seat to thereby inhibit movement of the liquid out of the container through the dispenser, such that a desired quantity of liquid is dispensed therefrom; and
v) tiling the axis of the container back towards a generally vertical axis, wherein the primary ball disengages from the primary ball seat.

The above method including the alternate step of:
iv) a user manually moving the pouring tube further outwardly into a second extended position, such that depending legs of the retaining clip engage through respective openings in the passageway of the upper portion, wherein when the axis of the container is tilted past the horizontal the primary ball is held away from the primary ball seat to thereby allow continuous movement of the liquid out of the container through the dispenser.

In another aspect of the invention there is proposed a liquid dispenser attachable to a neck of a container, comprising:
a body configured to sealable engage the neck of the container, the body including a generally annular top and a generally cylindrical sleeve depending therefrom;
a pouring tube dimensioned to slidably engage the generally cylindrical sleeve, the pouring tube including a passageway extending therethrough for passage of a fluid;
a biasing member positionable within the body and configured to bias the pouring tube into a first extended position relative the body; and
a turbulence forming element positioned within or adjacent the passageway for generating turbulence in a flow of the fluid as it passes through the passageway to thereby entrain or capture air within the flow to aerate the fluid.

The liquid dispenser having a turbulence forming element may include a retaining clip configured to fixedly connect to the body to maintain the pouring tube in slidable engagement with the body.

The turbulence forming element may be an irregular or uneven inner surface of the pouring tube, that forms eddies or currents in the flow of fluid which act to aerate the flow. In another form the turbulence forming element may be fixed or movable member that is retained within the passageway, for instance a static or movable spiral race may be located within the passageway.

An aperture or apertures may extend through a side or sides of the pouring tube wherein air is drawn in through the aperture or apertures as fluid moves along the passageway to entrain the air into and thereby aerate the fluid.

BRIEF DESCRIPTION OF THE DRAWINGS

The accompanying drawings, which are incorporated in and constitute a part of this specification, illustrate by implementation of the invention and, together with the description and claims, serve to explain the advantages and principles of the invention. In the drawings.

FIG. 4b is a side view of the dispenser of FIG. 4a;

FIG. 4d is an alternate side view of the dispenser of FIG. 4a;

FIG. 5a is a perspective view of the dispenser of FIG. 1 in a first extended position;

FIG. 5b is a side view of the dispenser of FIG. 5a;

FIG. 5c is a cross-sectional view of the dispenser of FIG. 5b through C-C;

FIG. 5d is an alternate side view of the dispenser of FIG. 5a;

FIG. 5e is a cross-sectional view of the dispenser of FIG. 5d through D-D;

FIG. 6b is a side view of the dispenser of FIG. 6a;

FIG. 6d is an alternate side view of the dispenser of FIG. 6a;

FIG. 20a is a perspective view of the assembled dispenser of FIG. 19;

FIG. 20b is a cross-sectional view of the dispenser of FIG. 20a through I-I, illustrating one embodiment of the turbulence forming element;

FIG. 21a is a perspective view of a fourth embodiment of the dispenser;

FIG. 21b is a cross-sectional view of the dispenser of FIG. 21a through J-J, illustrating an alternate embodiment of the turbulence forming element;

FIG. 25 is a cross section view, with enlargement, illustrating another embodiment of the lower portion of the pouring tube;

FIG. 26 is a perspective view of another embodiment of the upper portion of the pouring tube;

FIG. 27 is a rear view of the upper portion of FIG. 26;

FIG. 28 is a cross-sectional through M-M of the upper portion of FIG. 27;

DETAILED DESCRIPTION OF THE ILLUSTRATED AND EXEMPLIFIED EMBODIMENTS

Figure 1:
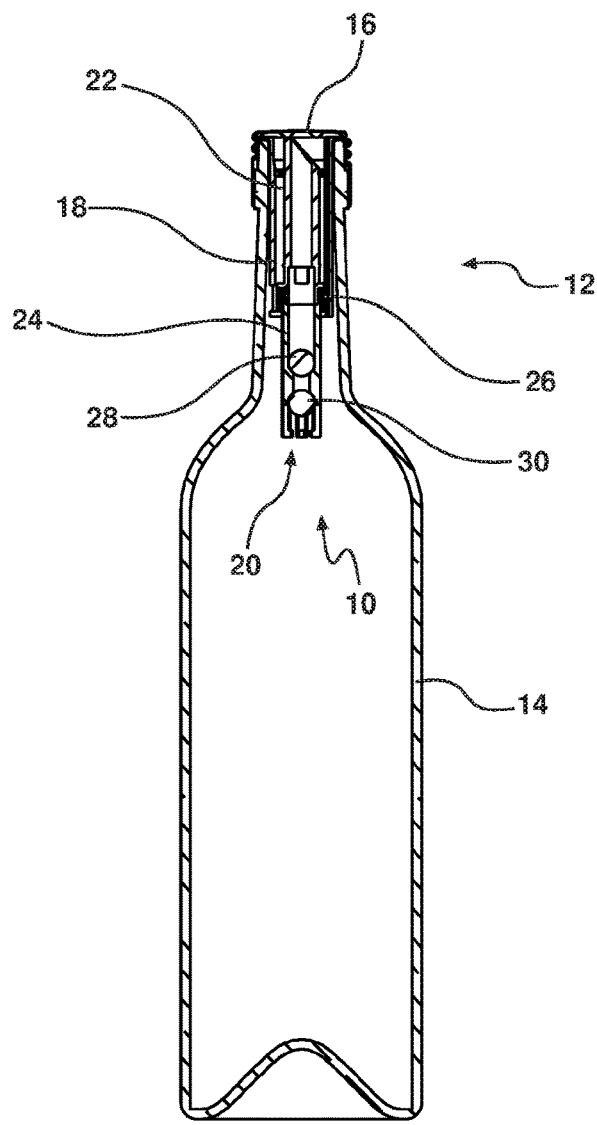
FIG. 1 is a side cross-sectional view of one embodiment of the liquid dispenser engaging a neck of a bottle, illustrating the pouring tube in a retracted position.

Similar reference characters indicate corresponding parts throughout the drawings. Dimensions of certain parts shown in the drawings may have been modified and/or exaggerated for the purposes of clarity or illustration. Referring to the figures for a more detailed description of the invention, there is illustrated a liquid dispenser 10 for a neck 12 of a bottle 14, demonstrating by way of an example, an arrangement in which the principles of one aspect of the present invention may be employed.

FIG. 1 illustrates one embodiment of the liquid dispenser 10, being a volumetric liquid dispenser, positioned within the neck 12 of the bottle 14, having a cap 16 attachable thereto. The body 18 of the dispenser 10 frictionally engages the neck 12 of the bottle, and the pouring tube 20, comprising upper and lower portions 22, 24, is held within the body 18, in the retracted position against the bias of the helical spring 26, by way of the cap 16. As further illustrated in FIG. 1, the dispenser 10 includes a primary ball 28 and a secondary ball 30.

Figure 2:
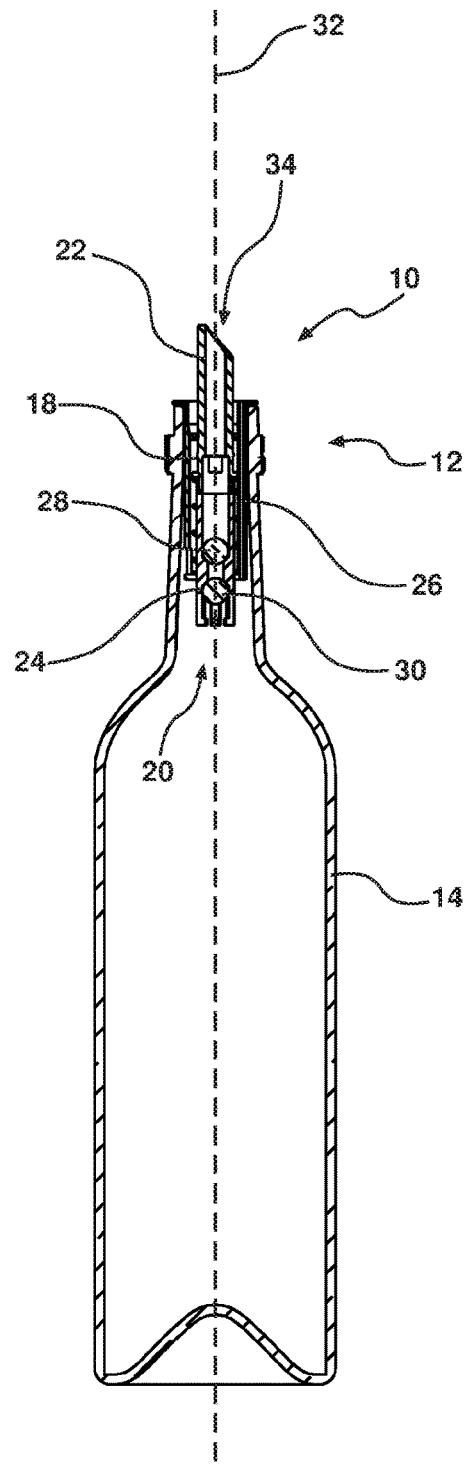
FIG. 2 is a side cross-sectional view of the dispenser of FIG. 1, illustrating the pouring tube in a first extended position.

FIG. 2 illustrates the pouring tube 20 in a first extended position, wherein the upper portion 22 protrudes outwardly from the body 18 of the dispenser 10. The reader should appreciate that when the cap 16 is removed from the bottle 14 the pouring tube 20 is caused to move from the retracted position, as illustrated in FIGS. 1 and 4a to 4e, into the first extended position, as illustrated in FIGS. 2 and 5a to 5e, under the influence of the helical spring 26 or another biasing member. FIGS. 2 and 5a to 5e, illustrate the helical spring 26 in an expanded arrangement.

In the first extended position, when the longitudinal axis 32 of the bottle 14 is tilted toward or past the horizontal, the fluid from within the bottle 14 is caused to flow out through the passageway 34 and the primary ball 28 which has a diameter only slightly smaller than the inner diameter of the passageway 34, moves along the passageway 34, under the influence of gravity, until it abuts the primary ball seat 36. This stops the flow of the liquid out of the pouring tube 20 to thereby dispense a predetermined quality of the liquid.

Figure 3:
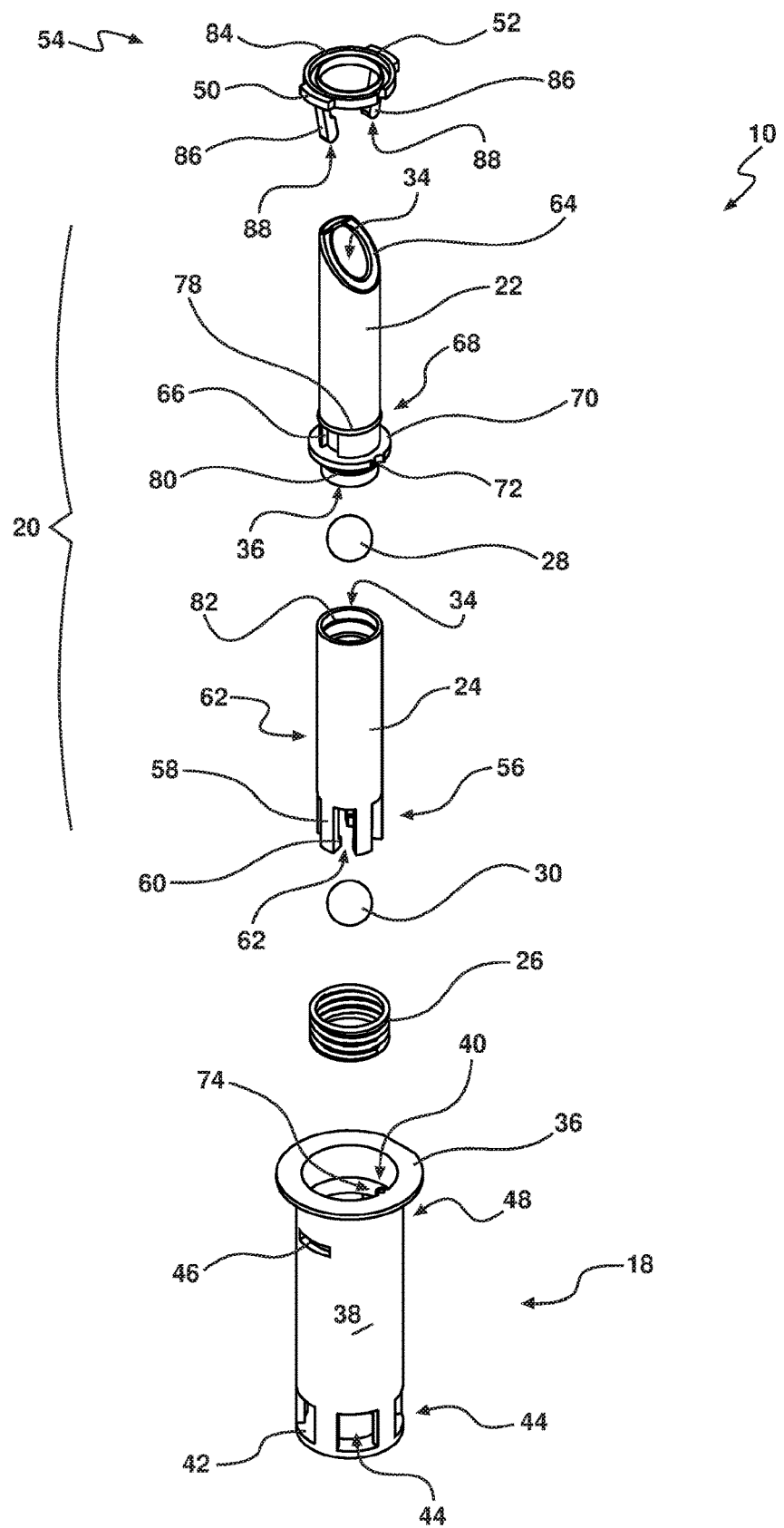
FIG. 3 is an exploded view of the dispenser of FIG. 1.

FIG. 3 illustrates an exploded view of the dispenser 10, illustrating the body 18 including an annular top 36 and a cylindrical sleeve 38 depending therefrom. The body 18 further includes a venting aperture 40 extending therethrough, as is known in the art for pouring apparatus. A spring seat 42 is configured to support the helical spring 26 thereon and sleeve 38 includes a plurality of openings 44 in a lower end for passage of the liquid therethrough. The opposing slots 46 48 are located through the sleeve 38 in an upper part thereof, for engagement with respective projections 50, 52 on opposite sides of a retaining clip 54.

The pouring tube 20 is dimensioned to slidably engage the sleeve 38 and includes the passageway 34 extending therethrough. The lower portion 24 is generally cylindrical and includes a cage 56, which is configured to retain the secondary ball 30. As illustrated in FIG. 3, the cage 56 may comprise a plurality of depending fingers 58 with inwardly extending free ends 60. The lower portion 24 includes a secondary ball seat 62 adjoining the cage 56, wherein the secondary ball 30 can abut therewith, when the bottle 14 is tilted past the horizontal.

Figure 4A:
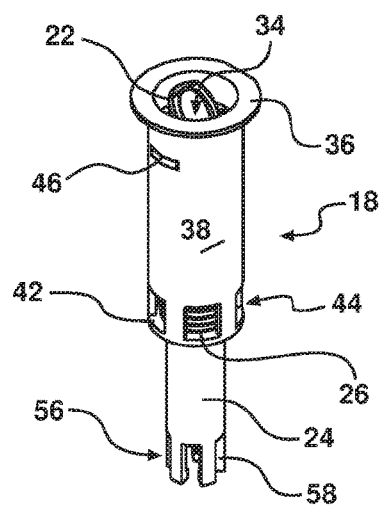
FIG. 4a is a perspective view of the dispenser of FIG. 1 in a retracted position.
Figure 4B:
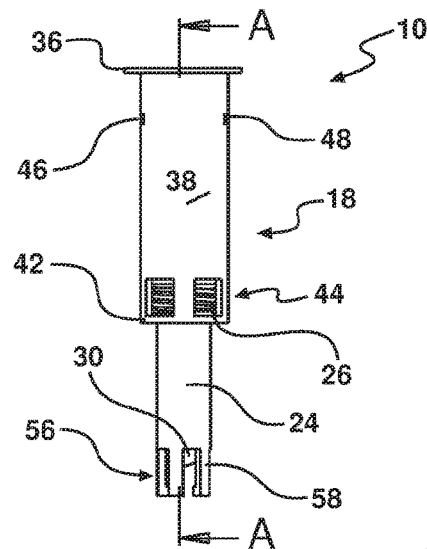
Figure 4C:
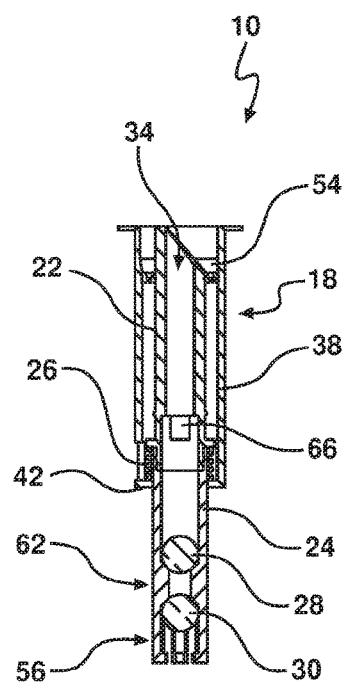
FIG. 4c is a cross-sectional view of the dispenser of FIG. 4b through A-A.
Figure 4D:
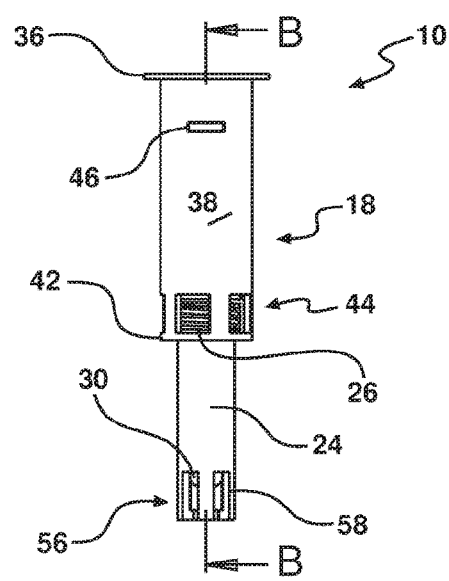
Figure 4E:
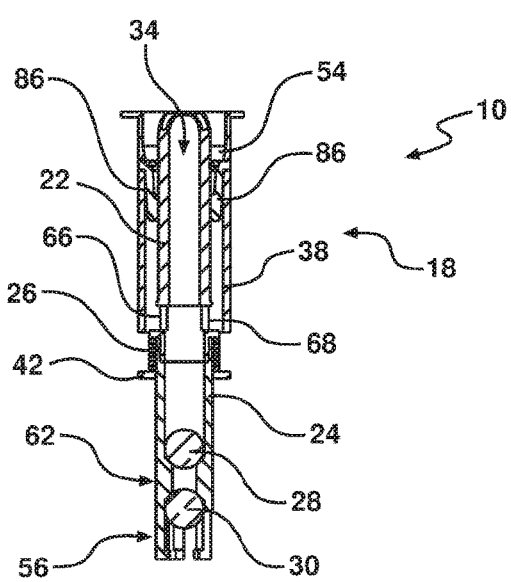
FIG. 4e is a cross-sectional view of the dispenser of FIG. 4d through B-B.
Figure 6A:
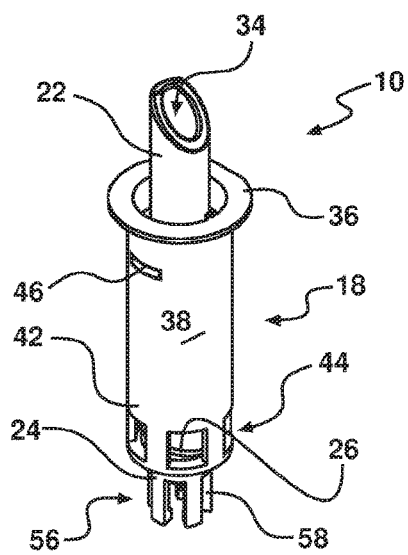
FIG. 6a is a perspective view of the dispenser of FIG. 1 in a second extended position.
Figure 6B:
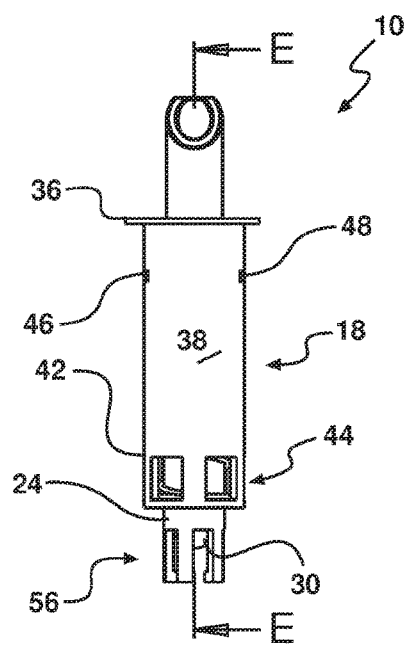
Figure 6C:
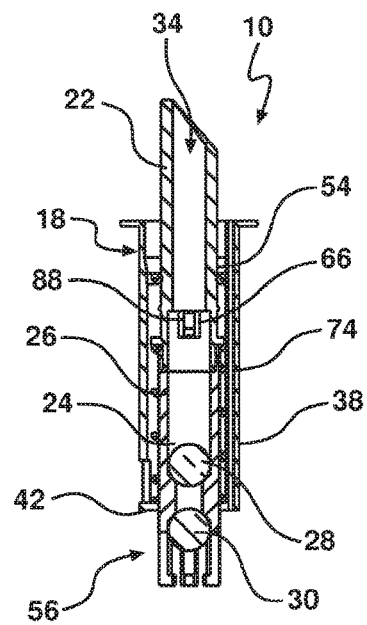
FIG. 6c is a cross-sectional view of the dispenser of FIG. 6b through E-E.
Figure 6D:
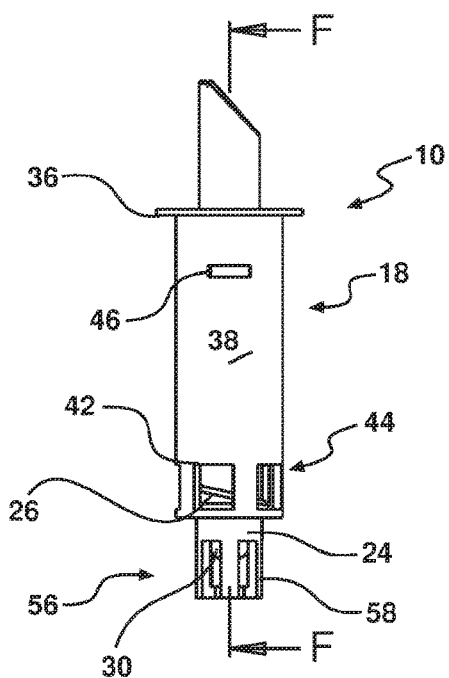
Figure 6E:
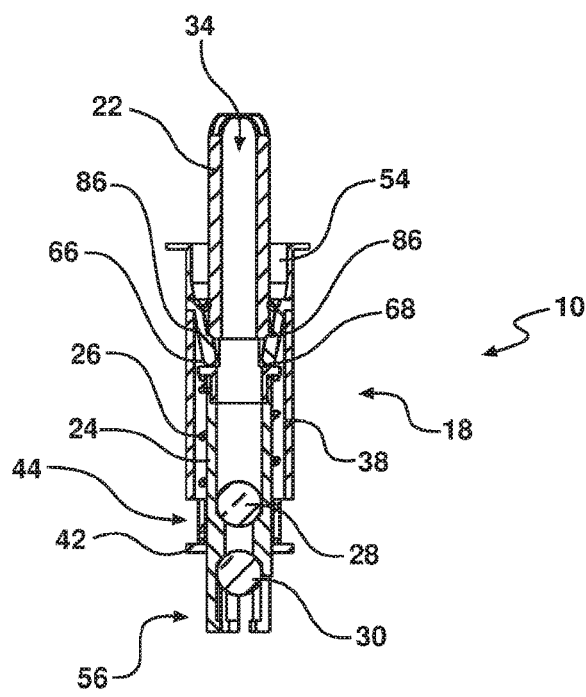
FIG. 6e is a cross-sectional view of the dispenser of FIG. 6d through F-F.
Figure 7:
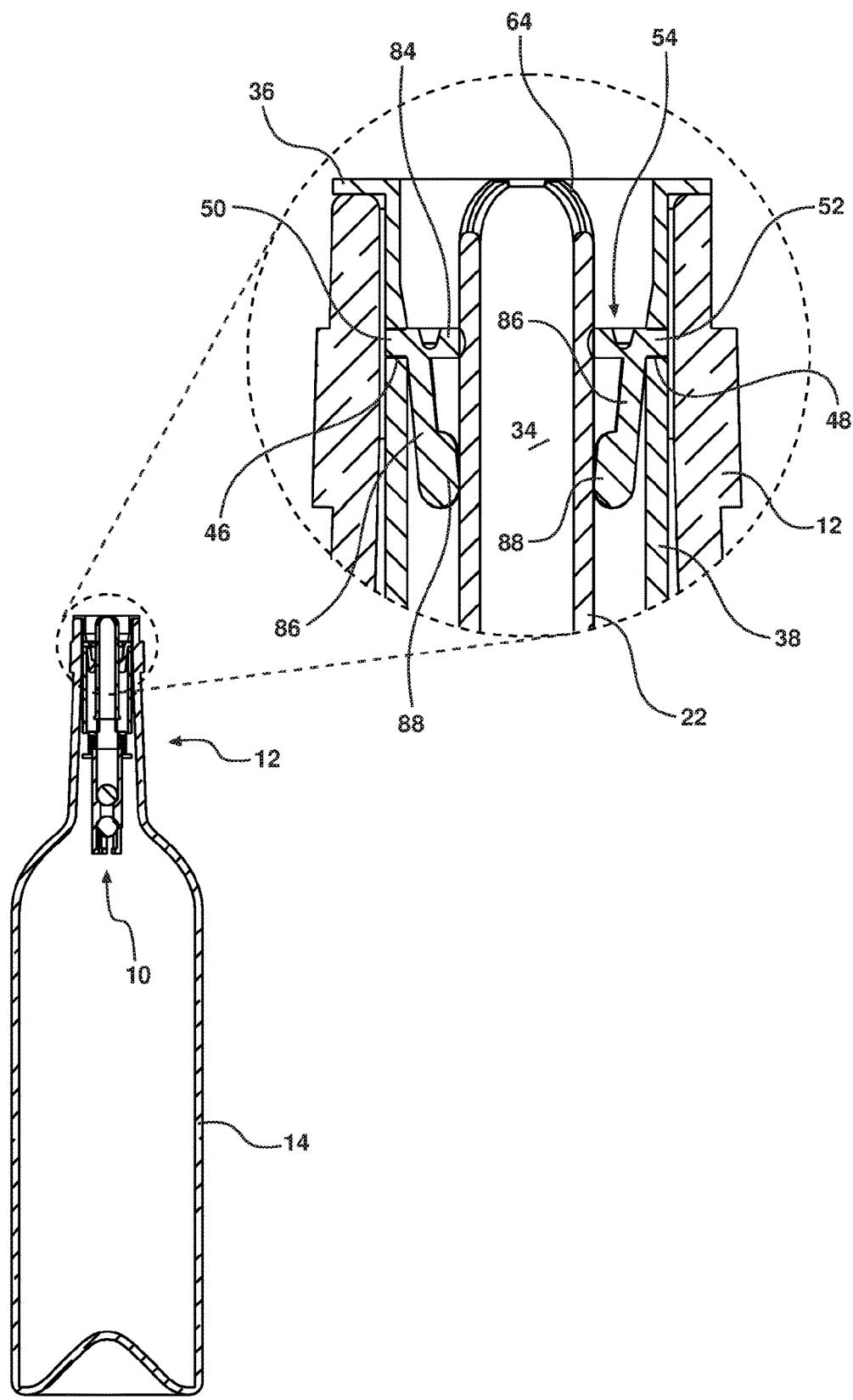
FIG. 7 is a cross-sectional view of the dispenser of FIG. 1, illustrating an enlarged section of the pouring tube in the retracted position.

The lower portion 24 further includes a narrower portion at the mid region thereof, as illustrated in FIG. 4c and other figures. The secondary ball 30 is movable, under the influence of gravity, whereby when the bottle 14 is tilted past the horizontal orientation the secondary ball 30 abuts the secondary ball seat 62 to inhibit movement of the liquid through the mid region of the lower portion.

Accordingly, when the upper and lower portions 22, 24 of the pouring tube 20 are assembled, the primary ball 28 is moveably held within the passageway 34, and in one aspect of the invention is able to abut the primary ball seat 36, when the bottle 14 is tilted past the horizontal to thereby control the dispensing of a desired volume of liquid.

As the skilled addressee will appreciate the secondary ball 30 is configured to inhibit rear pressure being applied to the primary ball 28 which would otherwise force it along the passageway 34. Accordingly, the primary ball 28 is permitted to move through, or with, the liquid under the influence of gravity, as is known in the art. The section of the lower portion 24 above the mid region is configured to retain the primary ball 28, wherein the primary ball 28 is able to freely move therealong.

As further illustrated in FIG. 3, the upper portion 22 is generally cylindrical and includes a slanting top edge 64 to inhibit dripping of the fluid when pouring. The primary ball seat 36 is located adjacent a lower end of the upper portion 22, adjacent and above opposing openings 66, 68.

The upper portion 22 includes an outwardly extending shoulder 70, adjacent the lower end and configured to engage with a top of the helical spring 26. When assembled the helical spring 26 is preferably held between the spring seat 42 of the body 18 and the outwardly extending shoulder 70 of the upper portion 22.

The shoulder 70 includes a notch 72 that is configured to slidably engage a longitudinally extending ridge 74 that extends down an inner surface of the sleeve 38. The retaining clip 54 also includes a notch 76 in a part thereof that is likewise configured to slidably engage the ridge 74. In this way the horizontal orientation of the pouring tube 20 is fixed relative to the retaining clip 54.

Figure 8:
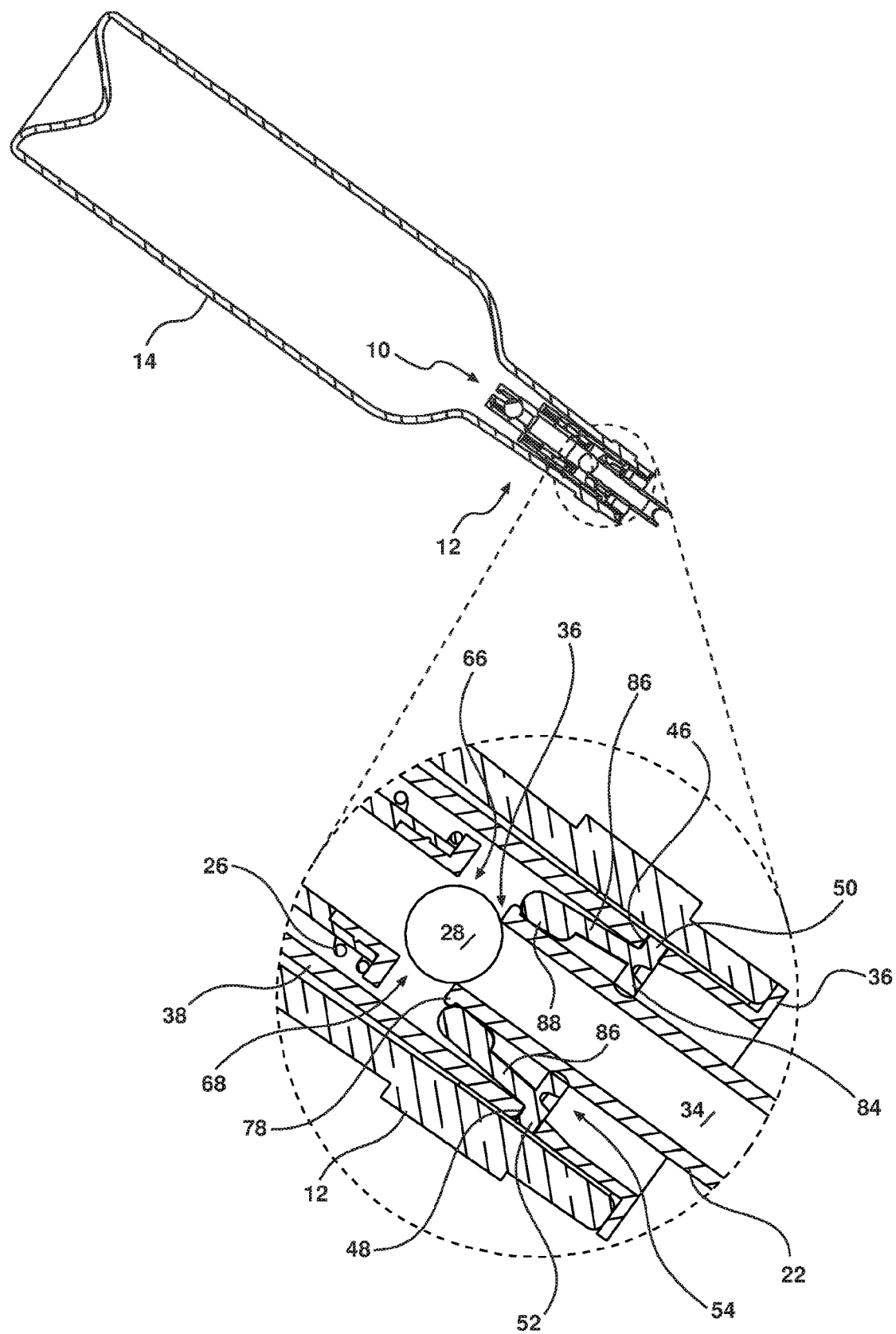
FIG. 8 is a cross-sectional view of the bottle and dispenser of FIG. 2, illustrating an enlarged section of the pouring tube in the first extended position, and the bottle tilted such that the primary ball abuts the primary ball seat.
Figure 10:
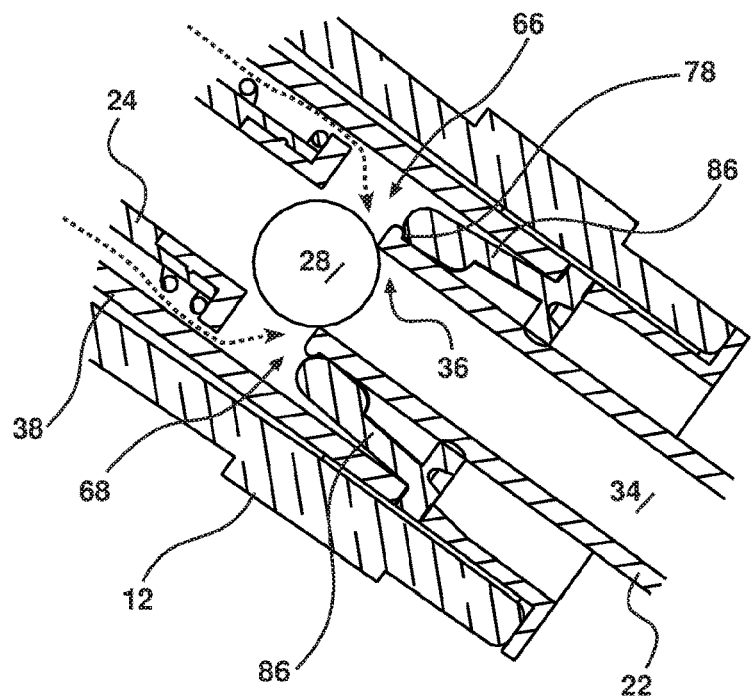
FIG. 10 is the enlarged sectional view of FIG. 8 illustrating the flow of liquid being inhibited by the primary ball abutting the primary ball seat.

The upper portion 22 includes an annular lip 78 above and adjacent the opposing openings 66, 68. The pouring tube 20 is movable under the influence of the helical spring 26 into a first extended position wherein the inwardly facing extension 88 of the legs 86 engage the annular lip 78 such that the pouring tube 20 is prevented from moving further outwardly from within the body 18, as illustrated in FIGS. 5e, 8 and 10. In this position, when the bottle 14 is tilted towards or past the horizontal the primary ball 28 is able to abut the primary ball seat 36, to thereby inhibit movement of the liquid out of the bottle 14 through the dispenser 10, as illustrated in FIGS. 8 and 10.

Figure 9:
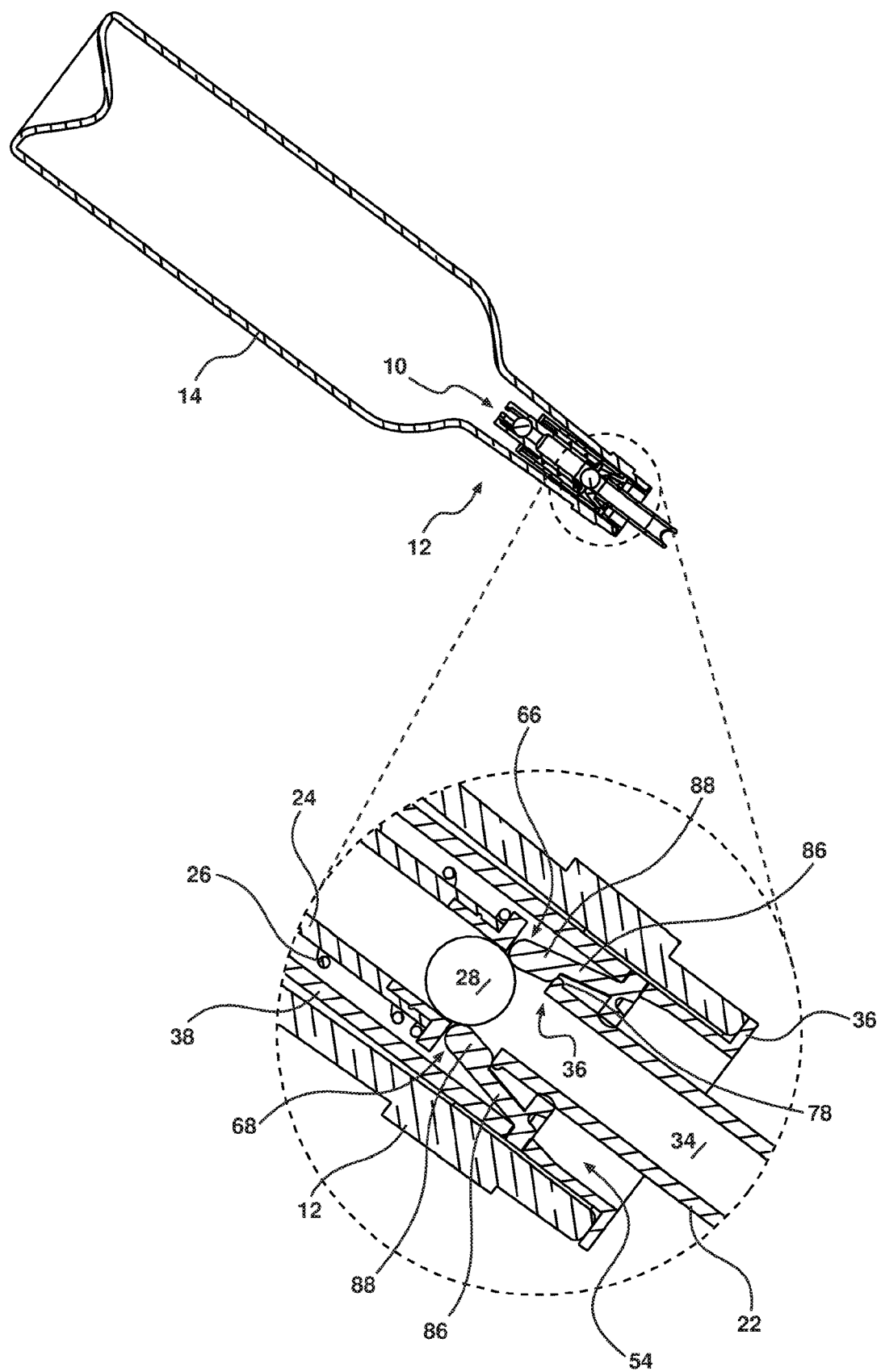
FIG. 9 is an enlarged cross-sectional view of the bottle and dispenser of FIG. 2, illustrating the pouring tube in a second extended position, and the primary ball held apart from the primary ball seat.
Figure 11:
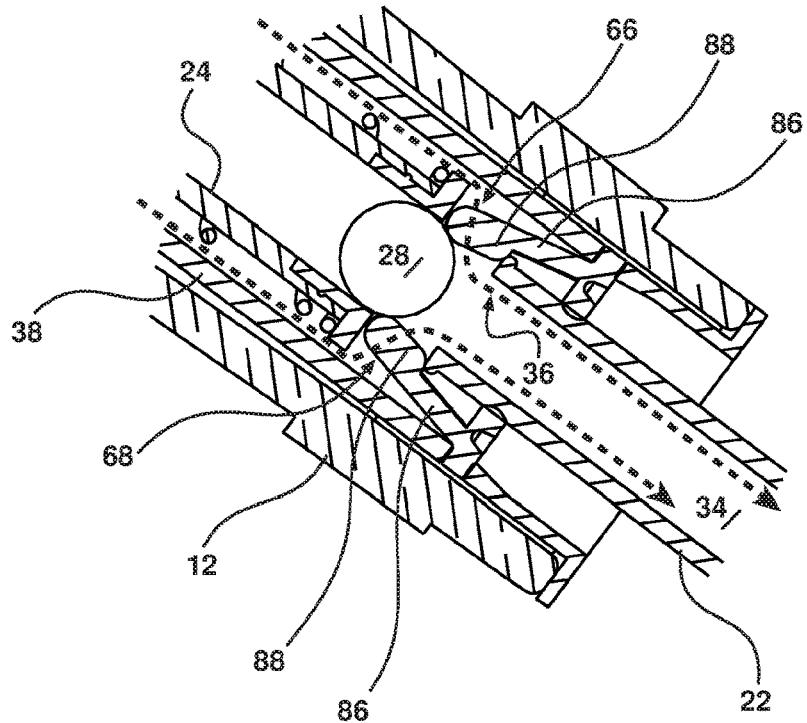
FIG. 11 is the enlarged sectional view of FIG. 9 illustrating the flow of liquid through the opposing openings.

The reader will appreciate that the pouring tube 20 may be manually moved further outwardly, into a second extended position, wherein the inwardly facing extensions 88 are caused to move past the annular lip 78, as illustrated in FIGS. 6a to 6e. The manual movement may be as a result of the user grasping the upper portion 22 and pulling it further out against a frictional resistance. The extensions 88 can then engage through respective openings 66, 68, in the upper portion 22. This means that when the bottle 14 is tilted towards or past the horizontal the primary ball 28 is held away from the primary ball seat 36, as illustrated in FIGS. 9 and 11, to thereby allow movement of the liquid out of the bottle 14 through the dispenser 10, as indicated by the broken arrows in FIG. 11.

Turning back to FIG. 3, the lower end of the upper portion 22 is shaped to engage into the top of the lower portion 24 and includes an annular protrusion 80 that is configured to engage a correspondingly shaped groove 82 in an inner surface of the lower portion 24. In this way the lower and upper portions can be fixedly connected.

As further illustrated in FIG. 3, the retaining clip 54 comprises a generally annular part 84 with the projections 50, 52 on opposite sides thereof. Legs 86 depend from opposite sides of the annular part 84 and include respective inwardly facing extension 88, which are configured to engage through the opposing openings 66, 68 of the upper portion 22, to thereby inhibit the primary ball 28 from abutting the primary ball seat 36, as shown in FIGS. 9 and 11. The reader should appreciate that the extension 88 do not completely block the openings 66, 68 and fluid is permitted to still flow therethrough into the passageway 34 for dispensing therefrom, as illustrated in FIG. 11.

Figure 12:
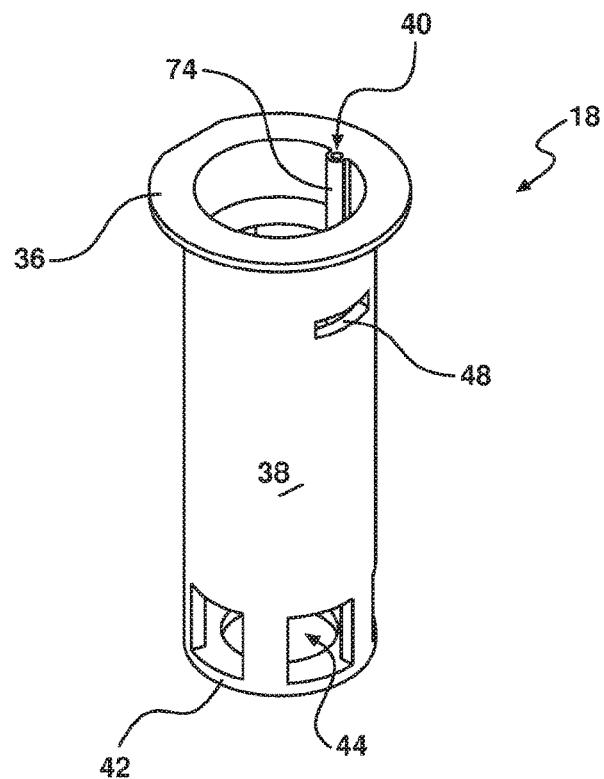
FIG. 12 is a perspective view of the body of FIG. 3.
Figure 13:
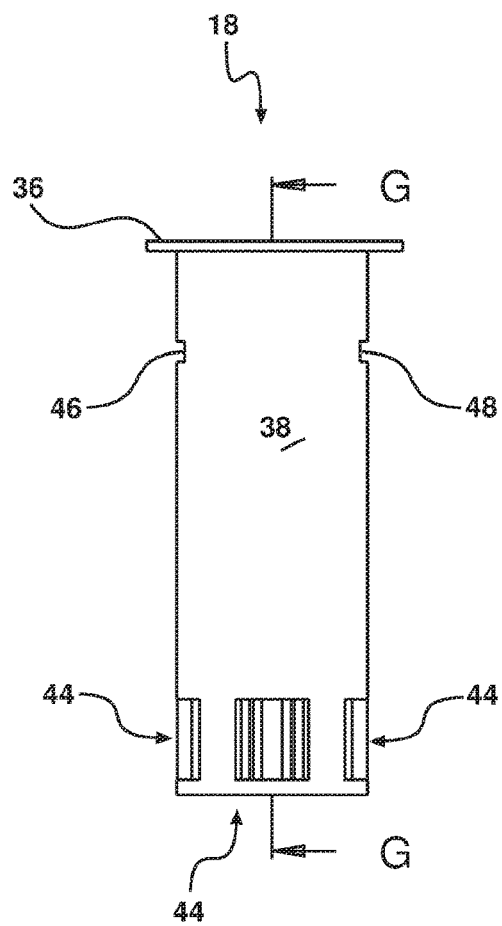
FIG. 13 is a side view of the body of FIG. 12.
Figure 14:
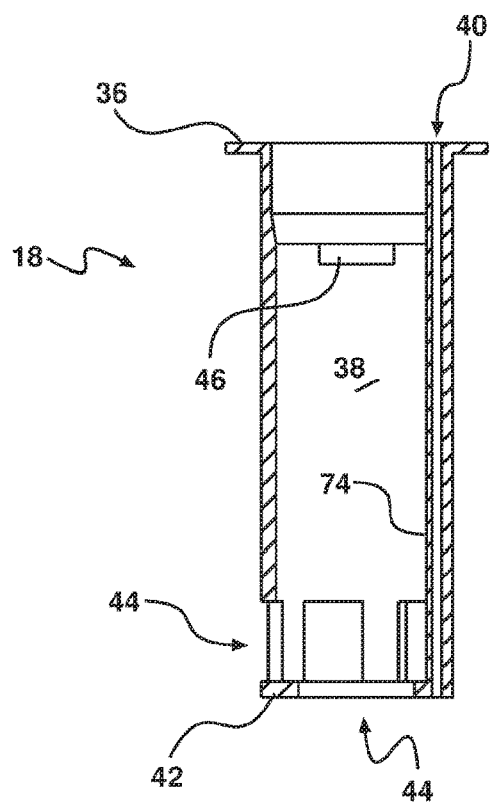
FIG. 14 is a cross-sectional view of body of FIG. 13 through G-G.

FIGS. 12 to 14 illustrate an alternate embodiment of the body 18 of the dispenser 10, wherein the venting aperture 40 is formed within a longitudinally extending ridge 74 that extends down the inner surface of the sleeve 38. FIGS. 12 and 14 illustrate one of the plurality of openings 44 extending vertically through the spring seat 42. Accordingly, the spring seat 42 may be generally annular shaped and engages the bottom of the helical spring 26.

FIGS. 15 to 18 illustrate a further embodiment of the dispenser 10, comprising, a seal 100, upper spout 102, lower spout 104, main case 106, and breather pipe 108. The dispenser 10 also includes the helical spring 26, primary ball 28 and secondary ball 30, as previously described with reference to FIG. 3.

The purpose and configuration of the seal 100 is similar to the clip 54, which was previously described with respect to FIGS. 1 to 14. The seal 100 includes an annular top 110, flexible circumferential ridge 112 for bearing against the inner surface of the neck 12 to inhibit leakage, pivotable leg 86, channel 114 that is coaxially alignable with the breather pipe 108, and protrusions 116 for engagement with the main case 106, as illustrated in FIG. 17.

The upper spout 102 includes depending parts 118 that form recesses 120, which permit the flow therethrough into the passageway 34, during use. The bottom of each leg 118 include a projection 122 for engagement with the lower spout 104.

Figure 15:
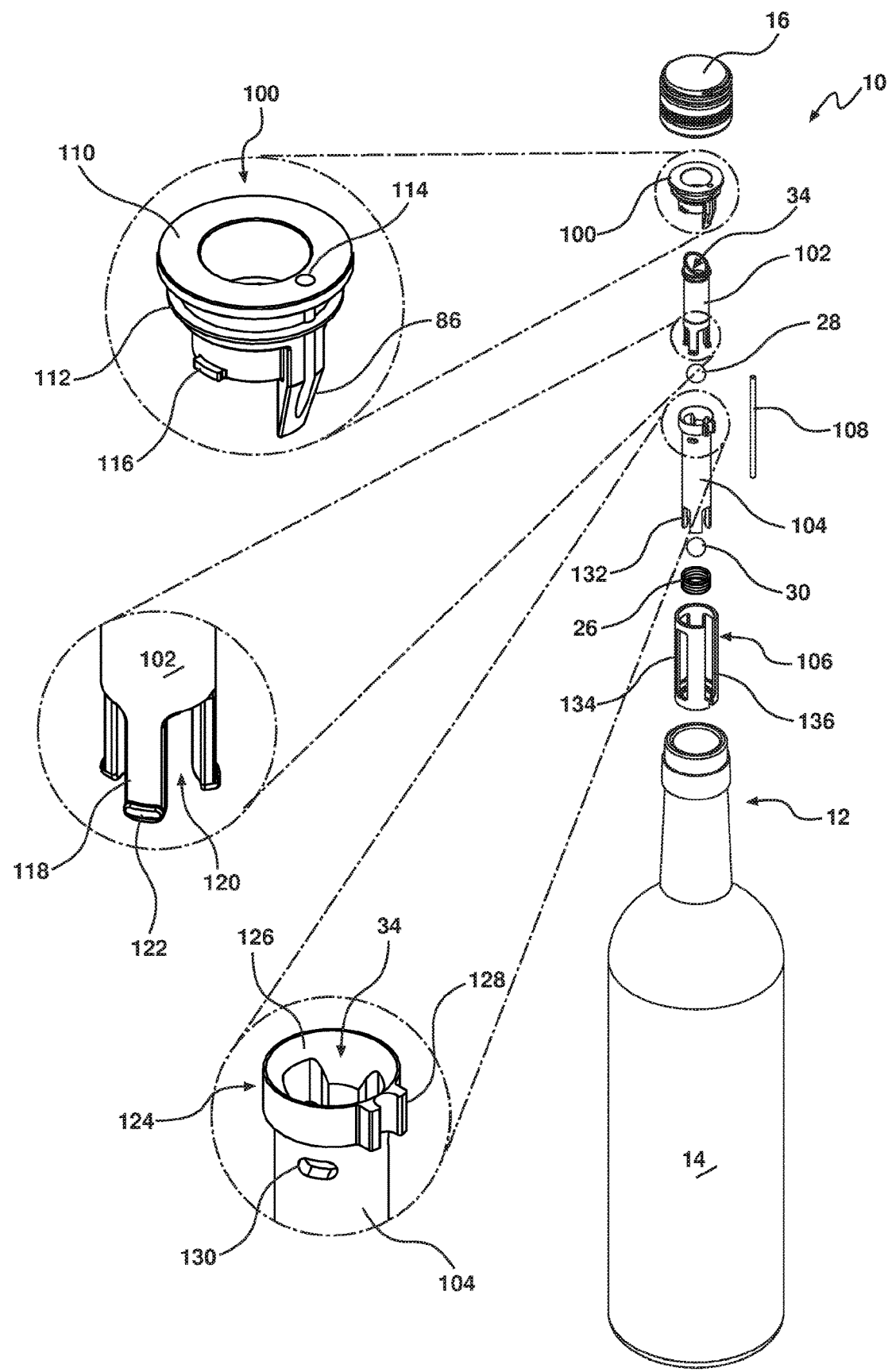
FIG. 15 is an exploded view a second embodiment of the dispenser.

As further illustrated in FIG. 15, the lower spout 104 include an upper portion 124 that includes a tapered collar 126, having a pipe engagement clasp 128 and slots 130 for engagement with projections 122 of the upper spout 102. The lower spout 104 includes depending parts 132 configured to retain secondary ball 30. The main case 106 is configured to hold the assembled upper and lower spouts 102, 104, and includes slots 134 for capturing protrusions 116 of the seal 100 and slot 136 for permitting passage of the pipe engagement clasp 128 therealong. The slots 134 and 136 also permit passage of fluid therethrough.

Figure 17:
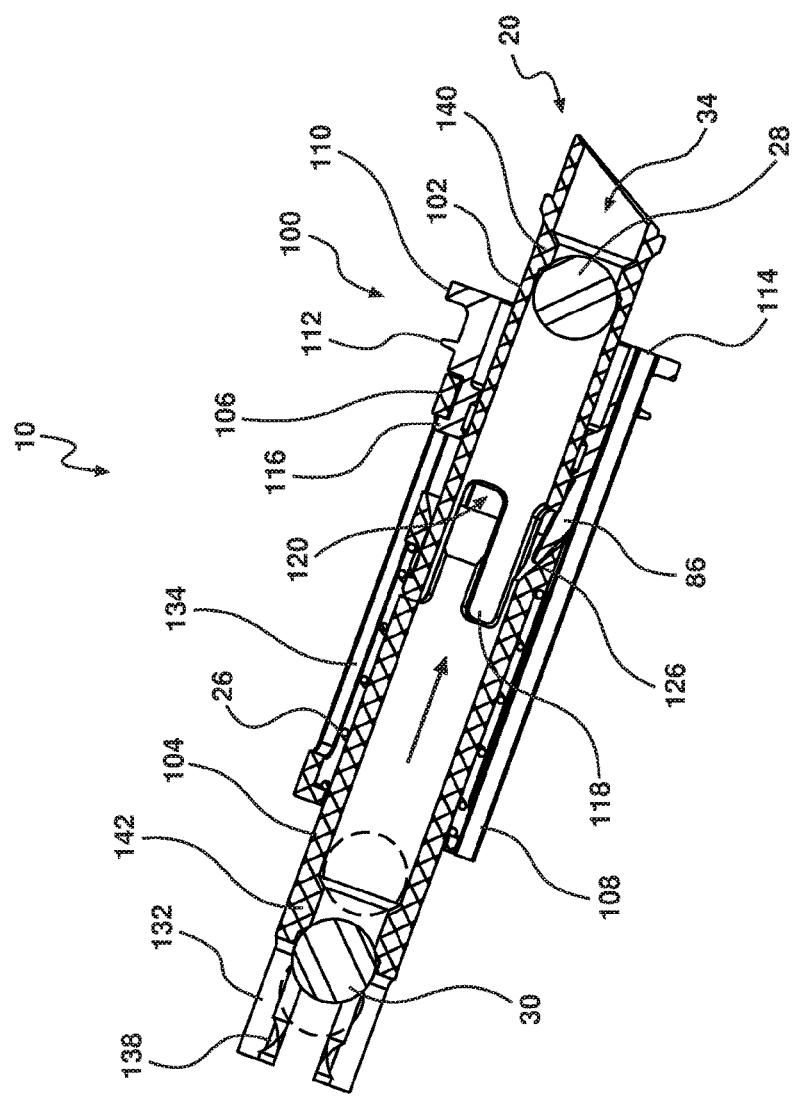
FIG. 17 is a cross-sectional view of the dispenser of FIG. 16 through H-H, illustrating movement of the primary ball.
Figure 16:
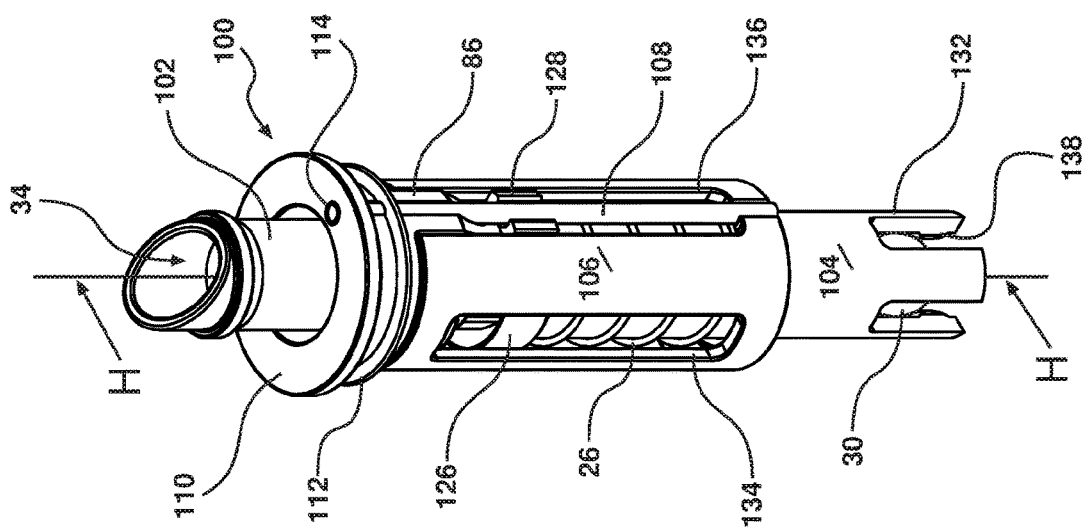
FIG. 16 is a perspective view of the assembled dispenser of FIG. 15.

As illustrated in FIGS. 16 and 17 the depending parts 132 of the lower spout 104 include inwardly projecting supports 138, for retaining secondary ball 30. As further illustrated in FIG. 17, when the spout assembly or pouring tube 20 is moved outwardly into a first position and the bottle 14 is tilted the primary ball 28 moves in the direction of the arrow, from a rest position as indicted by the dotted lines into a position where it bears against shoulder 140, whereby a designated volume of fluid is dispensed and after which the flow of fluid is stopped. The secondary ball 28 also moves in the same direction as indicated by the broken lines until it bears against shoulder 142, which also forms a seat for the primary ball 30, when it is at rest.

Figure 18:
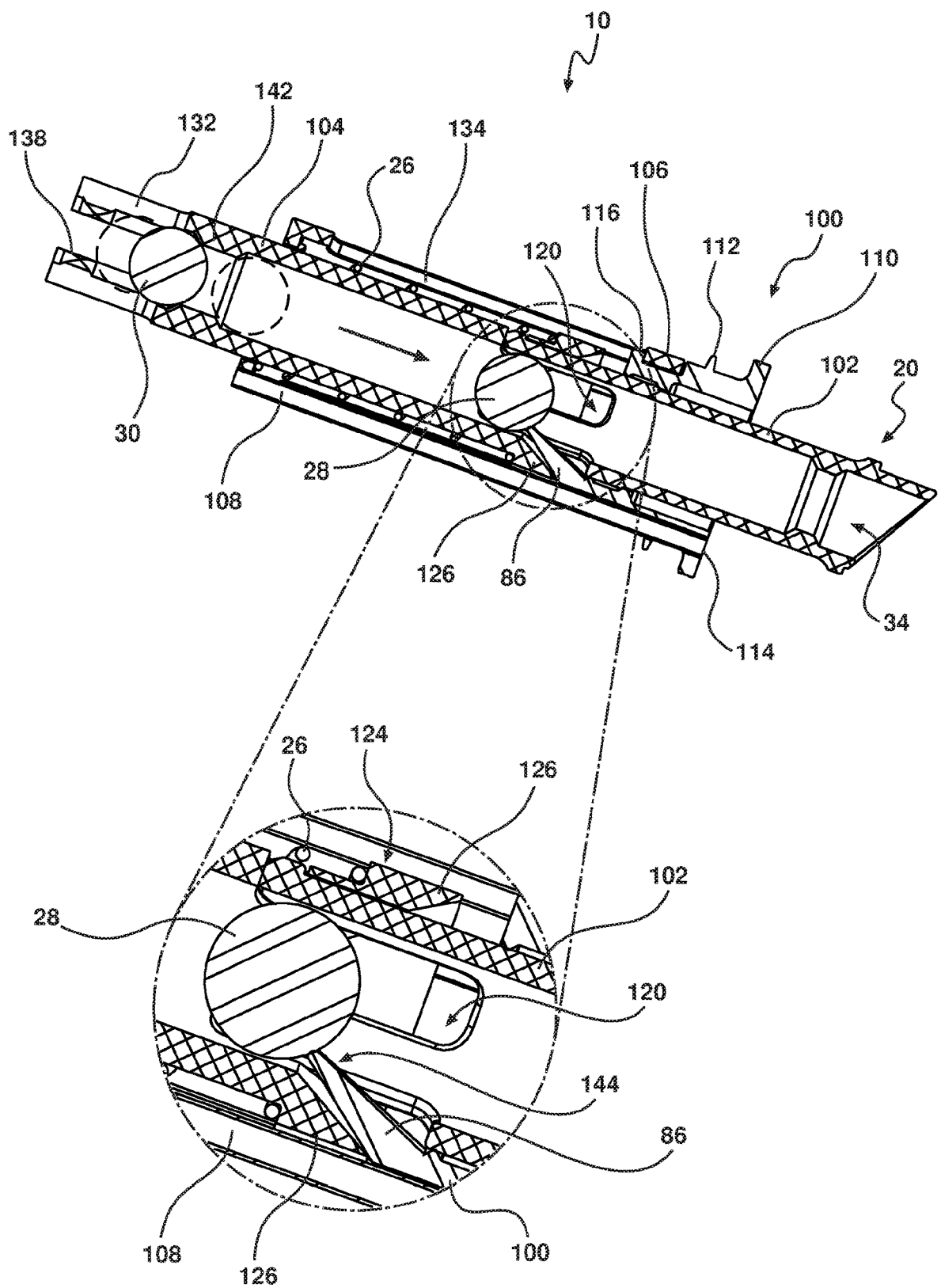
FIG. 18 is a cross-sectional view of the dispenser of FIG. 16 through H-H, illustrating the pouring tube in a fully extended position and the movement of the primary ball.

As illustrated in FIG. 18 when the spout assembly 20 is moved further outwardly the free end 144 of the pivotable leg 86 is caused to move inwardly as the tapered collar 126 bears thereagainst, as is best illustrated in the enlarged portion of FIG. 18. This means that the free end 144 of the pivotable leg 86 extends into the passageway 34 and thereby inhibits the movement of the primary ball 28 from passing. Accordingly, the recesses 120 are forward of the primary ball 28 and therefore remain open to allow fluid to flow along and out through the end of the passageway 34, to permit a continuous flow of the contents of the container out therethrough. The reader with now appreciate that the present invention in one embodiment provides a retractable spout that can be used to provide a volumetric dispenser or a continuous flow dispenser.

In another embodiment of the present invention, as illustrated in FIGS. 19 to 24, there is provide a retractable fluid aerating dispenser 200. As with the immediately preceding embodiment the present embodiment also includes a seal 202, a pouring tube 204, helical spring 26 and main case 206.

Figure 19:
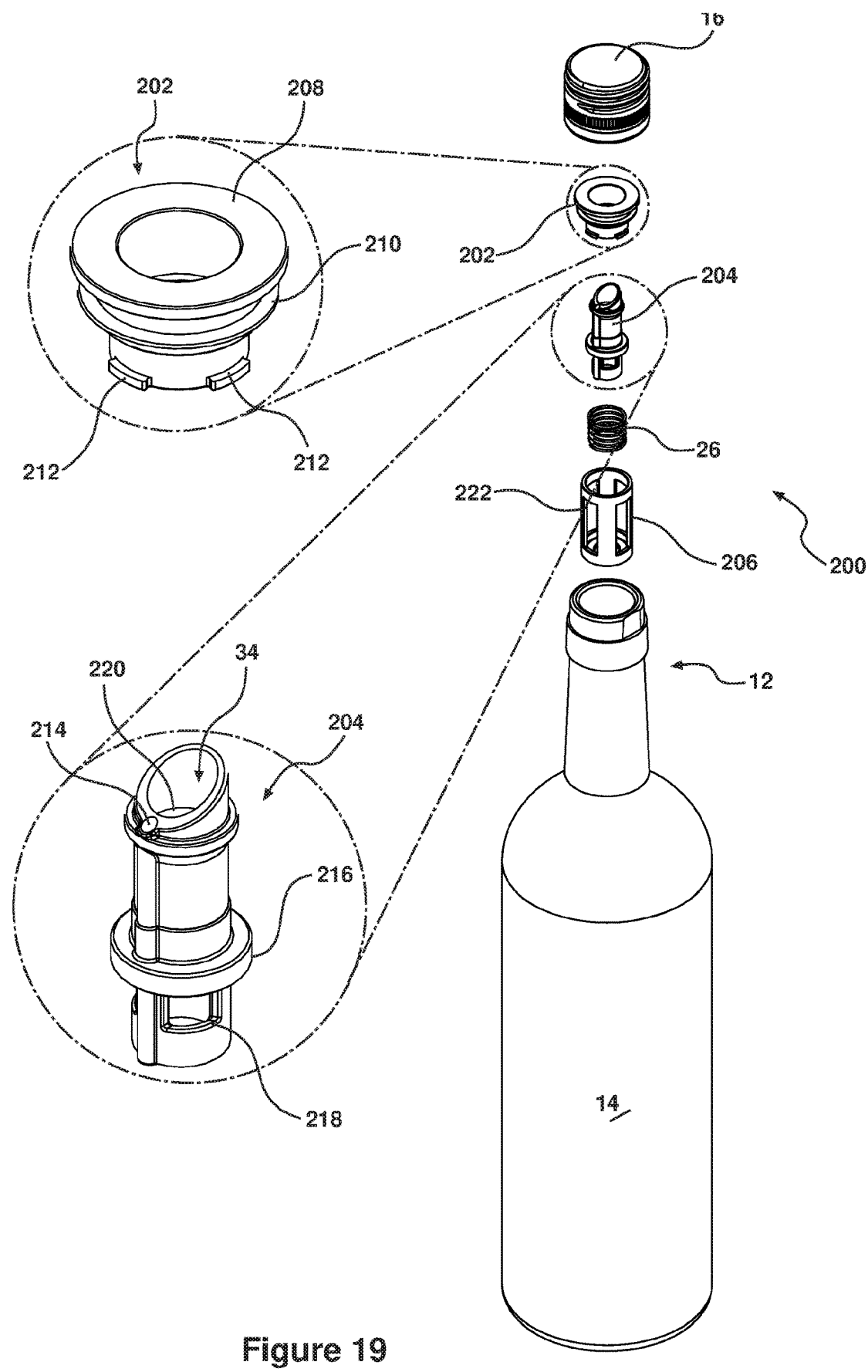
FIG. 19 is an exploded view of a third embodiment of the dispenser.

As illustrated in FIGS. 19, 20a and 20b, the seal 202 includes an annular top 208, flexible circumferential ridge 210 for bearing against the inner surface of the neck 12 to inhibit leakage and protrusions 212 for engagement with the main case 206, as illustrated in FIG. 20b.

The pouring tube 204 includes a passageway 34, integral breather pipe 214, annular shoulder 216 for bearing against the underside of the seal when biased by the helical spring 26 when the cap 16 is removed. The shoulder 216 ensures that the pouring tube 204 does not disengage from the dispenser assembly. The pouring tube 204 further includes openings 218 and a turbulence forming element 220 positioned within the passageway 34. The main case 206 is configured to hold the helical spring 26 and pouring tube 204, and includes slots 222 for capturing protrusions 212 of the seal 100 and permit passage of fluid therethrough. The base of the main case 206 also includes an opening 224 for permitting fluid to pass therethrough.

In another embodiment, as illustrated in FIGS. 21a and 21b, the seal 202 includes a passage 226 that is coaxially alignable with a breather pipe 228. The seal 202 of the present embodiment include a leg portion 230 for holding the breather pipe 228, and the main case 206 include a slot 232 for retaining a lower end of the breather pipe 228.

As illustrated in FIGS. 20b and 21b, the turbulence forming element 220, may simply be a passageway 34 having an irregular inner surface, such that turbulence in created in the flow of fluid as it passes through the passageway. In this way air is introduced into the fluid, which can be desirable for drinks, such as red wine.

Figure 22A:
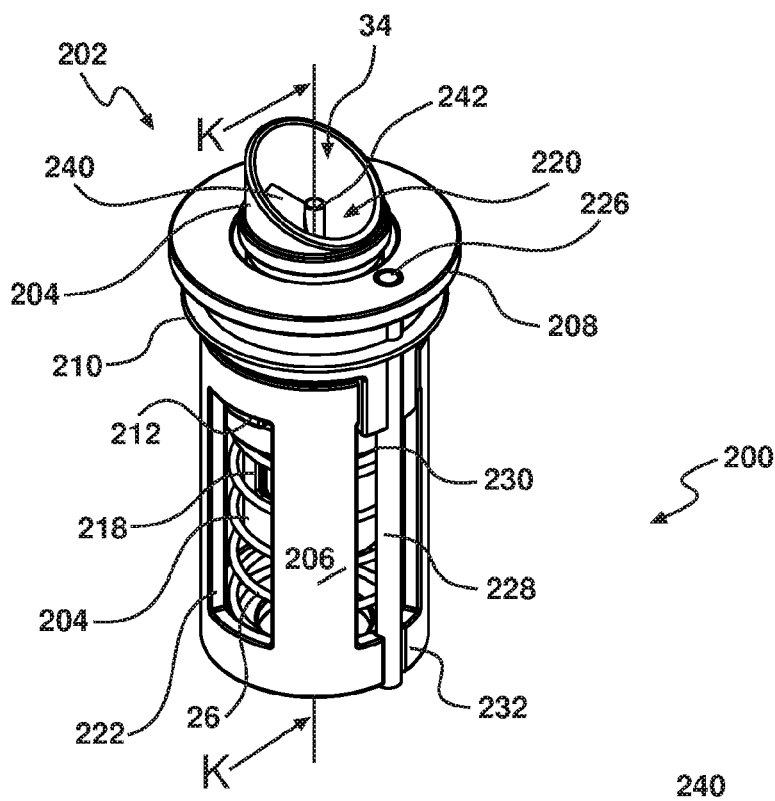
FIG. 22a is a perspective view of a fifth embodiment of the dispenser.
Figure 22B:
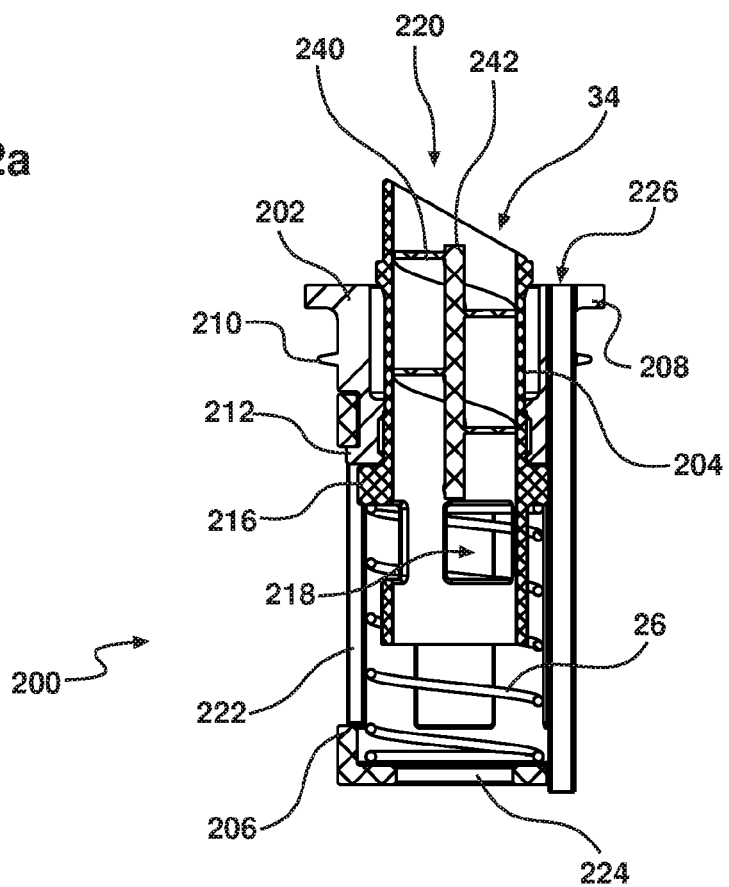
FIG. 22b is a cross-sectional view of the dispenser of FIG. 22a through K-K, illustrating another embodiment of the turbulence forming element.

In another embodiment, as illustrated in FIGS. 22a and 22b, the turbulence forming element 220 comprises a spiral race 240 with a central spine 242. In this configuration the fluid it forced along a spiral pathway which creates turbulence in the fluid flow thereby introducing air into the fluid.

Figure 23A:
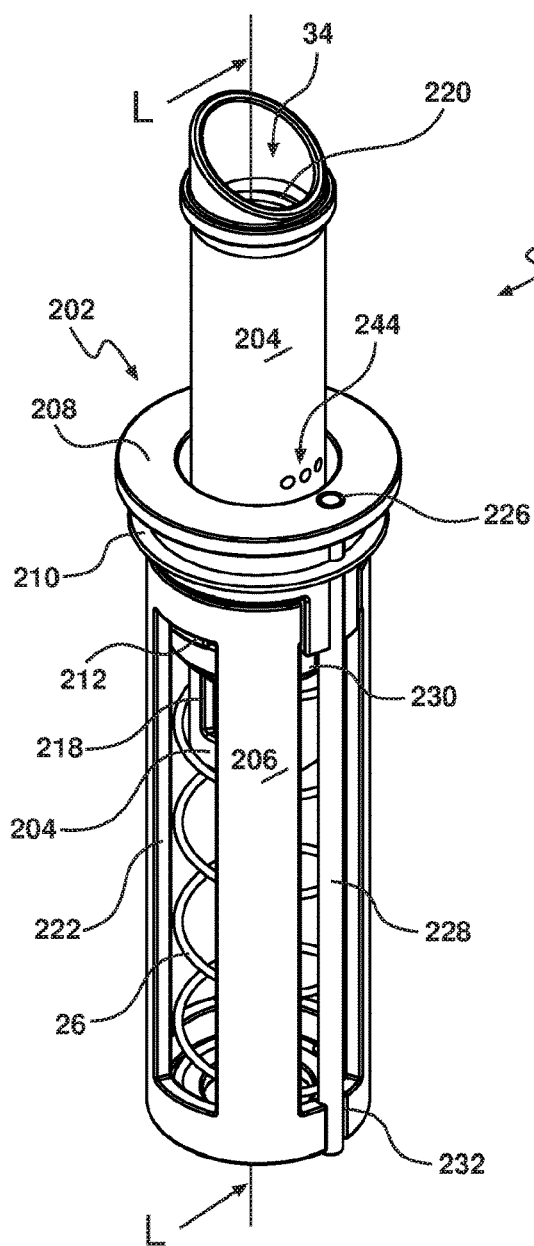
FIG. 23a is a perspective view of a sixth embodiment of the dispenser.
Figure 23B:
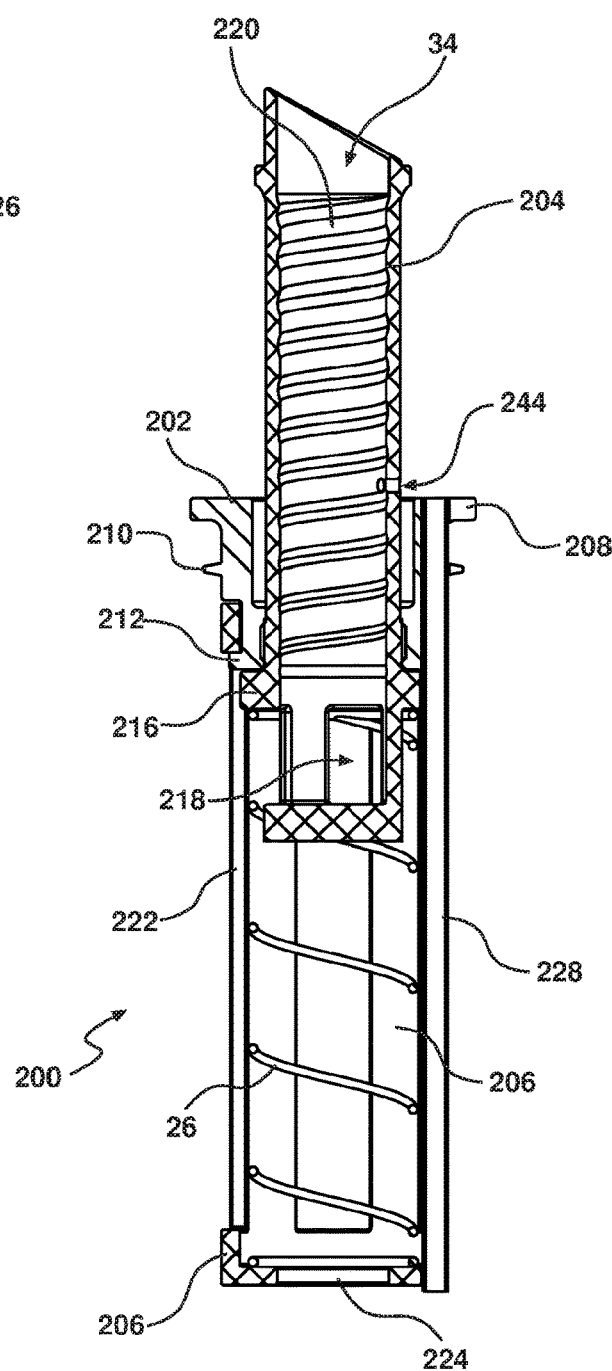
FIG. 23b is a cross-sectional view of the dispenser of FIG. 23a through L-L, illustrating apertures in the pouring tube.
Figure 24:
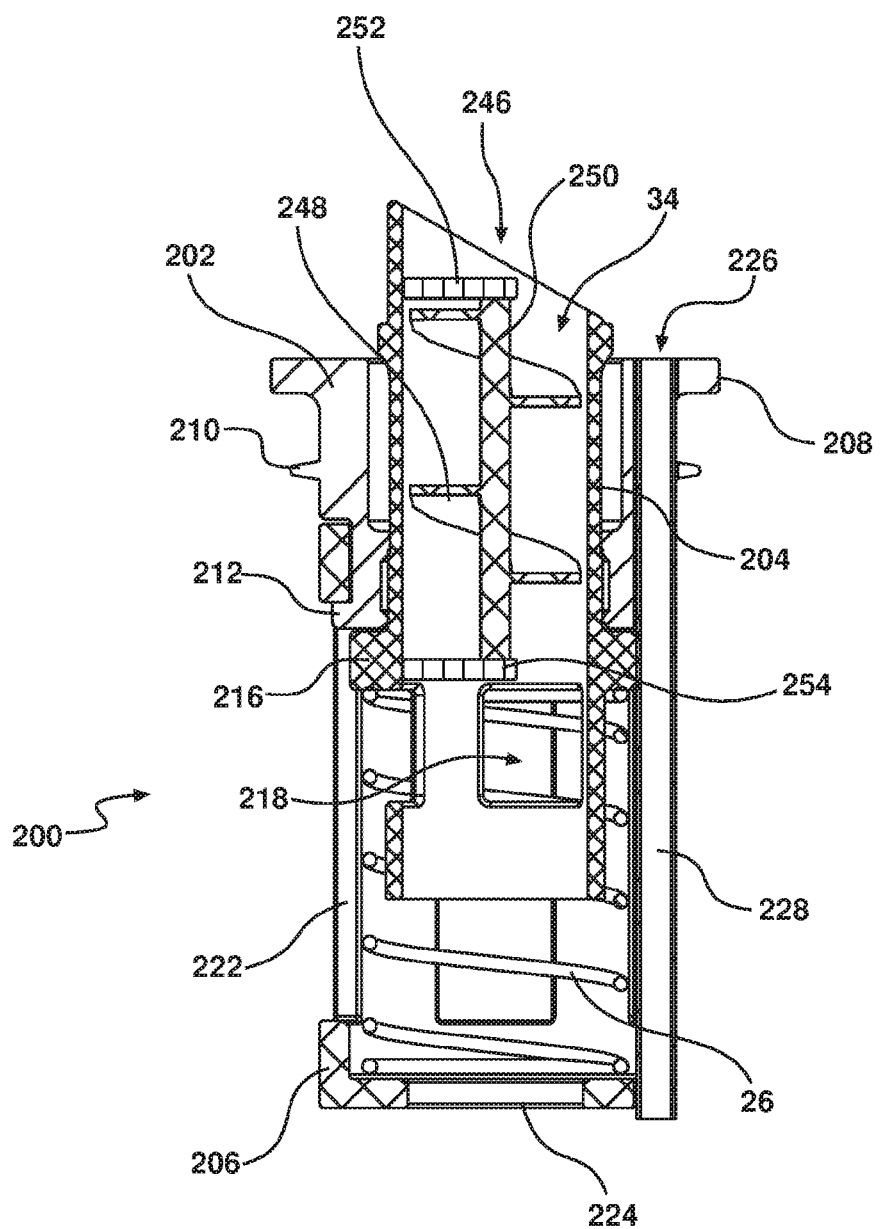
FIG. 24 is a cross-sectional view of a seventh embodiment of the dispenser illustrating a movable turbulence forming element.

In still another embodiment, as illustrated in FIGS. 23a and 23b, the pouring tube 204 includes apertures 244 that extend between an outer surface of the pouring tube 204 and the passageway 34, as shown in FIG. 23b. This assists in introducing air into the flow of fluid, which is entrain thereinto as the fluid flow through the pouring tube 204. As the reader will appreciate this will help to increase the air within the passageway 34 that in introducing into the flow of fluid due to the turbulence caused by the turbulence forming element 220.

In yet another embodiment, the turbulence forming element 220 comprises a movable element, which is one form, as illustrated in FIG. 25 is a movable device 246 comprising a spiral race 248 pivotable around a longitudinal axis that aligns the central spine 250, wherein the central spine 250 rotatably engages upper support 252 and lower support 254. The reader should however appreciate that the invention may include other types of movable elements, such as pivotable flap, perpendicularly aligned rotatable devices or hinged members that are all configured to produce turbulence in the flow of fluid to thereby aerate the fluid, or "Archimedean screw".

FIGS. 25 to 32, illustrate another embodiment of the volumetric dispensing assembly, however it should be appreciated that aspects of this embodiment, especially relating to the temporary seal formed by the O-ring and narrow part of the lower portion, are also relevant for the turbulence forming assembly and can be incorporated thereinto.

FIG. 25 illustrates a lower portion 300 of the pouring tube that includes a tapered top 302, slots 304, liquid passageway 306, enlarged compartment 308 and narrow part 310. The upper section 312 of the passageway 34 is dimensioned to allow passage of the primary ball 28. The purpose of the narrow part 310 is to slow the movement of the ball as the bottle is tilted, to ensure that the upper portion 314 fills with fluid. This resistance to movement will therefore temporarily delay the primary ball's movement to ensure the correct amount of fluid is retained within the pouring tube to be dispensed before the primary ball 28 comes into contact with the primary ball seat 36, which thereby terminate the flow of liquid.

Figure 31:
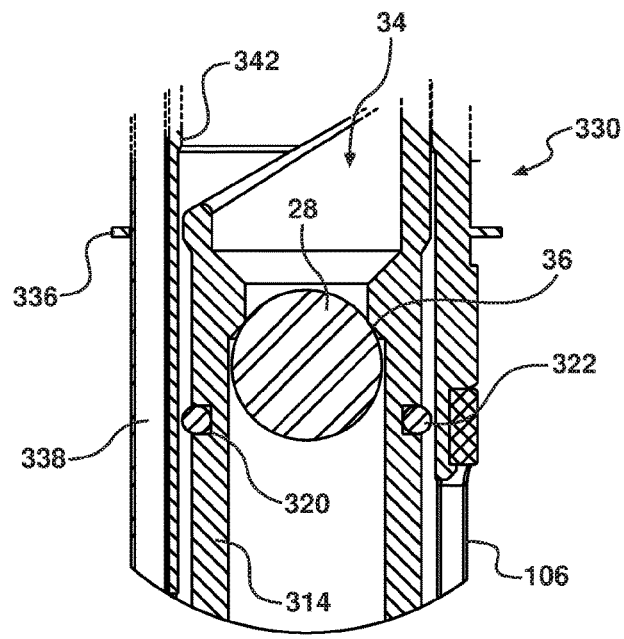
FIG. 31 is a side cross-sectional view of the upper portion of FIG. 26 in a retracted position, illustrating the location of an O-ring.
Figure 32:
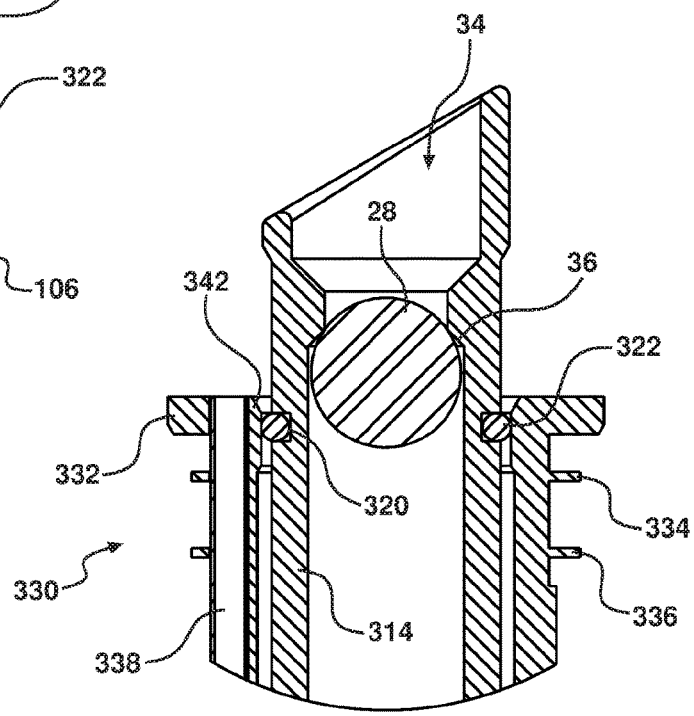
FIG. 32 is a side cross-sectional view of the upper portion of FIG. 26 in an extended position illustrating the O-ring bearing against a shoulder of the top or seal of FIG. 29.

FIGS. 26 to 28, illustrate another embodiment of the upper portion 314 of the pouring tube that includes projection 316 for engagement with the lower spout 300, openings 302 which permit the flow therethrough of fluid into the passageway 34 during use, and a circumferential groove 320 for retaining an O-ring 322, as shown in FIGS. 31, 32. The upper portion 314 further includes an expanded mouth part 324. As illustrated in FIG. 28, the primary ball seat 36 is just below the expanded mouth part 324.

Figure 29:
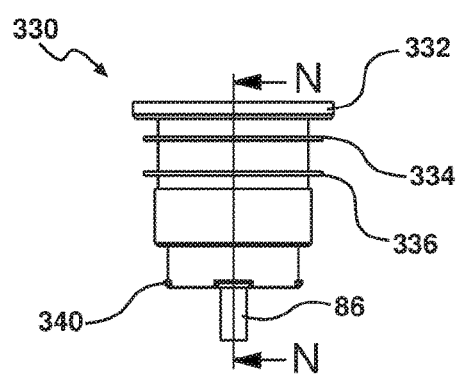
FIG. 29 is a side view of another embodiment of the top or seal.
Figure 30:
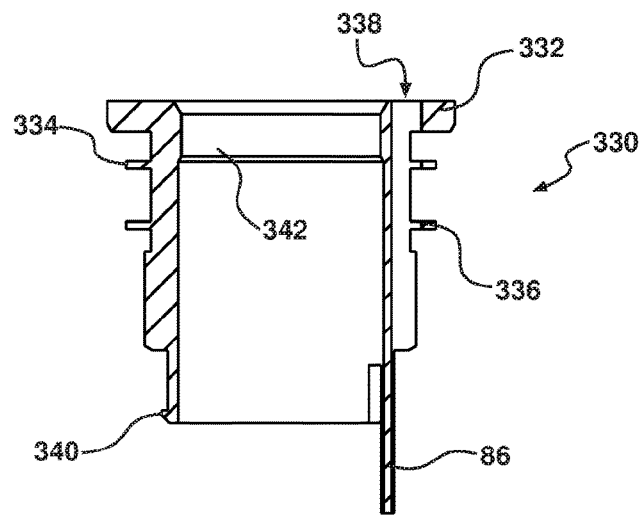
FIG. 30 is a cross-sectional view through N-N of the top or seal of FIG. 29.

FIGS. 29 to 30 illustrate another embodiment of the seal 330, having an annular top 332, two flexible circumferential ridges 334, 336 for bearing against the inner surface of the neck 12 to inhibit leakage, pivotable leg 86, channel 338 that is coaxially alignable with the breather pipe, and protrusions 340 for engagement with the main case 106, as previously discussed. The seal 330 further includes an annular shoulder part 342.

When assembled, as illustrated in FIGS. 31 and 32, the O-ring 322 connected to the upper portion 314, in the retracted position within the main case 106, is spaced apart from an inner side of the passageway 34. This ensures that O-ring 322 does not increase frictional while the pouring tube is being moved along the substantial length of the main case 106. As illustrated in FIG. 32 when the upper portion 314 of the pouring tube reaches the uppermost extended position, the O-ring 322 comes into contact with the annular shoulder part 342 of the seal 330, which inhibits leakage of the fluid out between the upper portion 314 and the inner side of the annular seal 330. As the reader will appreciate, the use of the O-ring 322 could also be incorporated into the embodiment disclosed in FIGS. 19 to 24, relating to the aerator.

The skilled addressee will now appreciate the advantages of the illustrated inventions over the prior art. In one aspect the invention provides a volumetric fluid dispenser that includes a retractable spout. This means that the spout can be protected from the surround environment when not in use. In another aspect the invention provides an apparatus that can both dispense a predetermined volume of liquid and permit continuous flow through of the liquid. In still another aspect the invention provides an aerating dispenser device for a fluid contained within a bottle.

Various features of the invention have been particularly shown and described in connection with the exemplified embodiments of the invention, however it must be understood that these particular arrangements merely illustrate the invention and it is not limited thereto. Accordingly, the invention can include various modifications, which fall within the spirit and scope of the invention.

The invention claimed is:

1. A liquid dispenser, attachable to a neck of a container, comprising:
a body configured to engage the neck of the container, said body including an annular top and a cylindrical sleeve depending therefrom;
a pouring tube dimensioned to slidably engage said cylindrical sleeve, the pouring tube including a passageway extending therethrough;
a biasing member positionable within or adjacent said body and configured to bias said pouring tube into a first extended position relative said body, whereby in the first extended position an outer end of the pouring tube extends outwardly of said neck of the container;
a volumetric dispensing assembly for dispensing a predetermined volume of a liquid, said volumetric dispensing assembly including a primary ball and a corresponding primary ball seat, and wherein when the pouring tube is in the first extended position and the container is tilted past a horizontal orientation, the primary ball abuts the primary ball seat and allows a predetermined quantity of the liquid to be dispensed from the container through the pouring tube; and
wherein the pouring tube is manually movable outwardly away from the annular outer end of the body by a user and into a second extended position where the primary ball is held spaced apart from the primary ball seat; and when the container is tilted towards or past the horizontal orientation, the liquid is permitted to move out of the container through the pouring tube, unrestricted by the action of the primary ball.

2. The liquid dispenser in accordance with claim 1, wherein the annular top and cylindrical sleeve are integrally formed.

3. The liquid dispenser in accordance with claim 2, wherein the annular top and cylindrical sleeve are fixedly connected.

4. The liquid dispenser in accordance with claim 1, wherein the pouring tube has an opening in a side thereof adjacent the primary ball seat.

5. The liquid dispenser in accordance with claim 4, wherein the upper portion of the pouring tube includes said primary ball seat adjacent a lower end thereof, said primary ball seat being located adjacent and above opposing openings in the passageway.

6. The liquid dispenser in accordance with claim 1, further including a retaining clip configured to fixedly connect to said body to maintain said pouring tube in slidable engagement with said body, the cylindrical sleeve including opposing slots in an upper part thereof for engagement with respective projections on opposite sides of the retaining clip.

7. The liquid dispenser in accordance with claim 6, wherein the retaining clip comprises a annular part, projections on opposite sides for engagement with respective slots in said sleeve, and a leg or legs depending from a side or sides of the annular part.

8. The liquid dispenser in accordance with claim 7, wherein the leg or legs include respective inwardly facing extensions that are configured to engage through an opening or opposing openings in the passageway of the upper portion, to thereby inhibit the primary ball from abutting said primary ball seat, but still allowing movement of fluid through the opposing openings into the passageway.

9. The liquid dispenser in accordance with claim 8, wherein the pouring tube is movable under the influence of the biasing member into the first extended position, wherein the inwardly facing extensions of the leg or legs engage the annular lip of the upper portion of the pouring tube, whereby when the container is tilted towards or past the horizontal the primary ball abuts the primary ball seat to thereby inhibit movement of the liquid out of the container through the dispenser.

10. The liquid dispenser in accordance with claim 9, wherein the pouring tube is manually movable further outwardly by the user, into a second extended position, such that the inwardly facing extensions are caused to move past the annular lip, whereby the extensions engage through respective openings in the passageway of the upper portion, wherein when the container is tilted towards or past the horizontal the primary ball is held away from the primary ball seat, to thereby allow unrestricted movement of the liquid out of the container through the dispenser.

11. The liquid dispenser in accordance with claim 1, wherein the biasing member is a helical spring and the body includes a spring seat or fixing means for supporting the helical spring thereon.

12. The liquid dispenser in accordance with claim 1, wherein the body includes a venting aperture extending therethrough or adjacent thereto.

13. The liquid dispenser in accordance with claim 1, wherein the pouring tube comprises an upper portion and a lower portion that are fixedly engageable.

14. The liquid dispenser in accordance with claim 1, wherein the volumetric dispensing assembly includes a secondary ball and a corresponding secondary ball seat.

15. The liquid dispenser in accordance with claim 14, wherein the secondary ball is movably held within a cage whereby when the container is tilted towards or past the horizontal orientation the secondary ball abuts the secondary ball seat to inhibit movement of the liquid through a mid region of the lower portion, thereby to inhibit rear pressure being applied to the primary ball which would otherwise force the primary ball along the passageway as the container is tilted.

16. The liquid dispenser in accordance with claim 1, wherein a turbulence forming element is positioned within or adjacent the passageway for generating turbulence in a flow of the fluid as the fluid passes through the passageway to entrain or capture air within the flow to thereby aerate the fluid.

17. The liquid dispenser in accordance with claim 16, wherein the turbulence forming element is an irregular or uneven inner surface of the pouring tube, that is configured to form eddies or currents in the flow of fluid which act to aerate the flow, or the turbulence forming element is a fixed or movable member that is retained within the passageway.

18. The liquid dispenser in accordance with claim 16, wherein an aperture or apertures extend through a side or sides of the pouring tube, wherein air is drawn in through the aperture or apertures as fluid moves along the passageway to therefore entrain air into and thereby aerate the fluid.

19. The liquid dispenser in accordance with claim 1, further comprising a turbulence forming element for aerating the liquid being dispensed, and wherein the turbulence forming element is contained within the pouring tube.

20. The liquid dispenser in accordance with claim 1, wherein the pouring tube is selectively movable to a retracted position where no portion of the pouring tube extends outwardly beyond the outer top of the body; and wherein the liquid dispenser further comprises a restraining member engageable with the body to maintain the pouring tube in the retracted position.

21. A method of dispensing a liquid from a container, including the steps of:
   a. providing a liquid dispenser, comprising, a body having an annular top and a cylindrical sleeve depending therefrom, a pouring tube dimensioned to slidably engage said sleeve, the pouring tube including a passageway extending therethrough and openings in sides thereof, adjacent a primary ball seat, at least one ball positionable within said passageway and selectively moveable to control the flow of liquid through said passageway, a biasing member positionable within said body and configured to bias said pouring tube into a first extended position relative said body, an-GI a retaining clip configured to fixedly connect to said body to maintain said pouring tube in slidable engagement with said body; the pouring tube being selectively movable into a second extended position that is further outwardly from the container relative to when the pouring tube is in the first extended position; and when the pouring tube is in the second extended position, the at least one ball is held spaced apart from the primary ball seat;
   b. attaching the liquid dispenser into a neck of the container;
   c. permitting the pouring tube to more into said first extended position under the influence of the biasing member;
   d. tilting the longitudinal axis of the container past a horizontal orientation, wherein the primary ball abuts the primary ball seat to thereby inhibit movement of the liquid out of the container through the dispenser, such that a desired quantity of liquid is dispensed therefrom; and
   e. tilting the axis of the container back towards a vertical axis, wherein the primary ball disengages from the primary ball seat.

22. The method in accordance with claim 21, including an alternate step d. and e. of:
   d. a user manually moving the pouring tube further outwardly into the second extended position, such that a depending leg or depending legs of the retaining clip engage through respective openings in the passageway of the upper portion, wherein when the axis of the container is tilted past said horizontal the primary ball is held away from the primary ball seat; and
   e. a continuous flow of the liquid out of the container through the dispenser to a volume determined by the user.

23. A liquid dispenser, attachable to a neck of a container, comprising:
   a body configured to be received within the neck of the container, said body including an annular top and a cylindrical sleeve depending therefrom;
   a pouring tube dimensioned to slidably engage said cylindrical sleeve, the pouring tube including a passageway extending therethrough;
   wherein said pouring tube is selectively restrainable in a retracted position within the body, and when in the retracted position, none of the pouring tube extends outwardly beyond the annular top of the body;
   wherein said pouring tube is movable to a first extended position wherein the pouring tube extends partially outwardly beyond the annular top of the body;
   wherein said pouring tube is selectively movable to a second extended position wherein the pouring tube extends even further outwardly beyond the annular top of the body relative to the first extended position;
   a biasing member configured to bias said pouring tube into the first extended position relative said body;
   a volumetric dispensing assembly for dispensing a predetermined volume of a liquid including a primary ball and a corresponding primary ball seat;
   wherein when the pouring tube is in the first extended position and the container is tilted past a horizontal orientation, the primary ball abuts the primary ball seat and thereby allows a predetermined quantity of the liquid to be dispensed from the container through the pouring tube; and
   wherein when the pouring tube is moved to the second extended position, the primary ball is held spaced apart from the primary ball seat and when the container is tilted towards or past the horizontal orientation, a continuous flow of the liquid is permitted to move out of the container through the pouring tube.

\* \* \* \* \*